United States Patent
Chen et al.

(10) Patent No.: US 7,480,516 B1
(45) Date of Patent: Jan. 20, 2009

(54) METHOD AND APPARATUS OF FORWARD LINK AND REVERSE LINK POWER CONTROL IN A CELLULAR WIRELESS COMMUNICATION SYSTEM

(75) Inventors: Xixian Chen, Nepean (CA); Guoqiang Xue, Nepean (CA); Mark Harris, Plano, TX (US); Weigang Li, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 829 days.

(21) Appl. No.: 10/975,000

(22) Filed: Oct. 28, 2004

Related U.S. Application Data

(60) Provisional application No. 60/519,250, filed on Nov. 12, 2003, provisional application No. 60/516,524, filed on Oct. 31, 2003.

(51) Int. Cl.
*H04B 7/00* (2006.01)
*H04Q 7/20* (2006.01)

(52) U.S. Cl. .................. 455/522; 455/69; 455/127.1; 455/127.2; 375/135; 375/136; 370/335; 370/342; 370/479

(58) Field of Classification Search ............ 455/69, 455/522, 127.1, 127.2, 126; 370/335, 342, 370/311, 479, 318, 320; 375/144, 148, 135, 375/136, 147, 146
See application file for complete search history.

(56) References Cited

U.S. PATENT DOCUMENTS

2002/0097697 A1 * 7/2002 Bae et al. .................. 370/335
2002/0101832 A1 * 8/2002 Chen et al. ................. 370/318

* cited by examiner

*Primary Examiner*—Tuan A Pham
(74) *Attorney, Agent, or Firm*—Borden Ladner Gervais LLP

(57) ABSTRACT

A cellular wireless communication system includes base transceiver stations and mobile stations that operate with a closed loop power control. The mobile tracking is performed based on the lock in and lock out thresholds by the base transceiver stations. A forward link power control bit is decoded from the reverse channel. An additional threshold is introduced for determining at the base transceiver station whether the decoded forward link power control bit is valid or invalid. The finger energies obtained from a finger processor formed by a RAKE receiver of the base transceiver station are compared to the additional validation threshold. The additional validation threshold is independent of the tracking thresholds and usually greater than them. The validation performance may not be affected by low signal/noise. The forward link traffic channel gain of the base transceiver station is controlled in response to the invalidity of the decoded forward power control bit. The decoding of the reverse link power control bit and the validity determination of the decoded reverse link power control bit are performed by similar methods to those of the forward link power control bit. With improved validation methods, the forward link and reverse link transmission power is more accurately controlled.

73 Claims, 22 Drawing Sheets

METHOD AND APPARATUS OF FORWARD LINK AND REVERSE LINK POWER CONTROL IN A CELLULAR WIRELESS COMMUNICATION SYSTEM

CROSS REFERENCE TO RELATED APPLICATIONS

This application claims the benefit of U.S. Provisional Application No. 60/516,524 filed Oct. 31, 2003 and U.S. Provisional Application No. 60/519,250 filed Nov. 12, 2003, which are incorporated herein by reference.

FIELD OF THE INVENTION

The present invention relates generally to a cellular wireless communication system and in particular to a method and an apparatus of forward link power control and a method and an apparatus of reverse link power control in a cellular wireless communication system with a closed loop power control.

BACKGROUND OF THE INVENTION

A known cellular wireless communication system is a Code Division Multiple Access (CDMA) system. The CDMA wireless phone system allows multiple cellular phone users to share the same frequency spectrum, and uses a generated Pseudo Noise (PN) code with a different and essentially orthogonal instance of the PN code assigned to each mobile unit within a cell. A base transceiver station receiver in a CDMA station correlates the received signal from a mobile station with the desired PN code, extracting the transmitted digital signal with a sufficient signal-to-noise ratio to achieve a satisfactory data error rate.

The general structure and operation of cellular wireless communication systems are generally known. A cellular network infrastructure typically includes a plurality of base transceiver stations that each services wireless communications for one or more cellular mobile stations within a respective cell. Typically, each base transceiver station supports a plurality of sectors within its serviced cell. A base station controller typically services a plurality of base transceiver stations and coordinates operations within the cells serviced by the base transceiver stations. A mobile switching center services a plurality of base station controllers and couples to the Public Switched Telephone Network (PSTN). Typically, the base station controllers or the mobile switching center couple to the Internet to service packetized communications.

Cellular wireless infrastructures typically support one or more wireless protocol standards. These wireless protocol standards include the CDMA protocol standards such as IS-95A, IS-95B, 1x-RTT, 1xEV-DO, 1xEV-DV, UMTS, and other CDMA type protocols. Alternately, the wireless protocol standard may service a Time Division Multiple Access (TDMA) standard such as the GSM standard, the North American TDMA standard, or other TDMA standards. The cellular mobile stations operating in the service area communicate with the base transceiver stations using such supported wireless protocol standards.

As is known, transmissions from a base transceiver station to a cellular mobile station thereof are called forward link transmissions. Likewise, transmissions from cellular mobile stations to base transceiver stations are called reverse link transmissions. The cellular network infrastructure coordinates and manages both the forward link and reverse link transmissions. Due to mobility of the cellular mobile stations, the forward link transmission power and the reverse link transmission power are controlled. In CDMA systems, for example, the reverse link transmission power and the forward link transmission power must be closely controlled for each cellular mobile station. Existing CDMA wireless protocol standards provide strict guidelines for a closed loop power control. With these standardized operations, a servicing base transceiver station controls the reverse link transmission power by sending (as necessary) power control bits on the forward link to each serviced cellular mobile station. These power control bits are typically contained in the power control sub-channel. For each power control bit, the cellular mobile station either increases its reverse link transmission power or decreases its reverse link transmission power, depending upon the value of the power control bit.

Prior cellular systems are predisposed to lose the reverse link. In order to reduce interference within a service sector or cell, prior art servicing base transceiver stations direct their service cellular mobile stations to transmit at a minimum acceptable reverse link transmission power level via use of the power control bits accordingly. Thus, reverse link transmissions typically arrive with minimally sufficient power at the servicing base transceiver station. With such prior systems, when the reverse link is lost, the base transceiver station (or the servicing base station controller) typically considers the mobile station as out of track and tries to keep forward link transmissions at the current power level, which may be too low for the mobile station to decode. Thus, many calls are dropped due to these prior power control operations.

Problems with prior power control operations are often caused by errors on the power control sub-channel, where a power-up bit transmitted by the base transceiver station may be incorrectly demodulated by the mobile station as a power-down bit. These "presumed" power-down bits cause a receiving cellular mobile station to reduce its reverse link transmission power when it should increase its reverse link transmission power. When a cellular mobile station is in soft handoff between base transceiver stations or softer handoff between sectors of the base transceiver station in a CDMA system, the cellular mobile station receives multiple power control bits from the multiple currently serving sectors. However, the cellular mobile station is disposed to more strongly consider a power-down power control bit than power-up power control bit. Thus, the cellular mobile station in such case is predisposed to reduce its reverse link transmission power which results frequently in loss of the reverse link. Thus, in many such prior operations, calls are dropped because of the failure to properly control the reverse link transmission power of the cellular mobile station.

It is, thus, necessary for controlling the reverse link transmission power of the cellular mobile station to correctly demodulate a power-up bit transmitted by the base transceiver station.

In CDMA 1xRTT and WCDMA (UMTS), a closed loop fast power control is introduced on the forward traffic channel to combat fast fading environments. This mechanism contributes to the substantial increase in the forward link air-interface capacity in comparison to IS-95. The forward link power control commands are decoded from the reverse power control sub-channel embedded on the reverse pilot channel. In one currently commercialized modem, for example, when there is at least one locked finger, the decoded binary power control bit is used for adjusting the forward link traffic channel gain either up (binary 0) or down (binary 1). If all the fingers are out of lock, no adjustment on the forward link traffic channel gain will be performed.

A problem with the currently used modem is that the forward power control bit validity is coupled with finger IN_LOCK and OUT_LOCK thresholds. The default values for IN_LOCK and OUT_LOCK thresholds are, for example, −32 dB and −37 dB, respectively. These two thresholds are very low. The primary consideration for choosing such low thresholds is the finger tracking performance. When the received signal-to-noise ratio is just above the OUT_LOCK threshold, the error rate for decoding the forward power control bit can be as high as 35% to 50%. As a result, the forward link traffic channel gain may be misadjusted.

For example, suppose a mobile station is at the edge of a cell and asks the base transceiver station to increase its transmitted forward link traffic power. Due to the decoding error, instead of increasing its transmitted power, the base transceiver station may incorrectly decrease its transmitted power. When the mobile station cannot correctly decode its received forward link traffic channel for a specific number of (e.g., 12) consecutive frames, it shuts down the transmitter thereof. Therefore, the base transceiver station can no longer hear the mobile station such that all fingers of the base transceiver station associated with that mobile station go out of lock. As a result, the forward link traffic channel power will stay at its current value until the call is dropped. The base transceiver station will try to decode the mobile's reverse link channel for a limited time, for example, five seconds. If not successful, the call will be eventually dropped.

It is, thus, necessary for controlling the forward link transmission power of the cellular mobile station to correctly demodulate a power-up bit transmitted by the mobile station.

SUMMARY OF THE INVENTION

It is an object of the present invention to provide an improved method and apparatus of forward link power control in a cellular wireless communication system. It is, also, an object of the present invention to provide an improved method and apparatus of reverse link power control in a cellular wireless communication system.

The present invention provides a method of forward link power control in a cellular wireless communication system and a cellular wireless communication system for performing the forward link power control therein by a closed loop power control. Also, the present invention provides a method of forward link power control in a cellular wireless communication system and a cellular wireless communication system for performing the reverse link power control therein by a closed loop power control.

In one example of the present invention, the cellular wireless communication system includes a base transceiver station and a mobile station. The base transceiver station includes a finger processor formed by a RAKE receiver, the finger processor having fingers for producing a signal in response to the reverse data traffic from the mobile station. The base transceiver station tracks the mobile station with reference to a tracking threshold value predetermined taking into account communication conditions. The base transceiver station and the mobile station are operably connected by a closed loop power control.

For example, in the base transceiver station, a forward link power control bit is decoded from a reverse power control sub-channel embedded on a reverse pilot channel in one power control group. A forward link power control bit validation threshold is set for determining whether the decoded forward link power control bit is valid. The forward link power control bit validation threshold is independent of the tracking threshold. For example, the value of the forward link power control bit validation threshold is different from and greater than that of the tracking threshold.

A signal level of the signal produced by the fingers of the finger processor is detected, in one power control group (PCG) in relation to the forward link power control bit. The value of the detected signal level is compared to the forward link power control bit validation threshold. It is determined whether the decoded forward link power control bit in relation to one power control group is valid, in response to the result of the comparing.

Advantageously, power control portions embedded in a reverse power channel are obtained based on the signal produced by the fingers of the finger processor. The obtained power control portions with respect to the one power control group (PCG) are combined in accordance with Maximum Ratio Combination (MRC). In accordance with the MRC data, comparing the MRC data to a predefined decoding threshold, the decoder decodes the forward link power control bit.

In one example, the base transceiver station includes a processing unit. The processing unit calculates the energy equivalent to an estimation of the ratio of signal energy per bit to the interference power spectral density (Eb/lo). The energy relating to the estimation ratio Eb/lo is calculated with respect to each finger of the finger processor and obtained in one power control group. The forward traffic frame consists of a plurality of the power control groups.

The calculated energy with respect to each finger of the finger processor is compared to the forward link power control bit validation threshold. For example, if at least one calculated energy in one power control group with respect to the finger exceeds the forward link power control bit validation threshold, the decoded forward link power control bit in relation to that power control group will be determined as valid.

In another example, the processing unit sums the calculated energies with respect to the fingers of the finger processor in one power control group and compares the summed energies to the forward link power control bit validation threshold. If the summed energies in the one power control group exceeds the forward link power control bit validation threshold, the decoded forward link power control bit in relation to that power control group will be determined as valid.

In a further example, the processing unit obtains power control portions embedded in a reverse pilot channel based on the signal produced by the fingers of the finger processor and produces an absolute value amplitude of the combined value of the power control portions with respect to the power control group. For example, the absolute value amplitude is a combination of all de-spreaded finger signals from the finger processor in accordance with Maximum Ratio Combination. Then, the absolute value amplitude is compared to the forward link power control bit validation threshold. If the absolute value amplitude exceeds the forward link power control bit validation threshold, the decoded forward link power control bit in relation to that power control group will be determined as valid.

Advantageously, the forward link power control bit validation threshold is set to a fixed value that is greater than the value of the tracking threshold. Or, the value of the forward link power control bit validation threshold may be set to an adaptively changed value based on communication conditions. For example, the communication condition is the reverse link target frame error rate set point that is used for the mobile station's reverse link out loop power control.

The processing unit may perform the function of marking the decoded forward link power control bit in relation to one power control group as valid or invalid in accordance with the determination result. Also, the processing unit may maintain or change a forward link traffic channel gain depending upon the marking of validity or invalidity of the decoded forward link power control bit in the power control group. In a case where the decoded forward link power control bit is marked as invalid, the processing unit causes the forward link traffic channel gain to be increased, with the results that the forward link transmission power increases.

Advantageously, the forward link traffic channel gain is increased by a step of a predetermined value, in response to each marking of the invalidity of the decoded forward link power control bit. The processing unit may cause the forward link traffic channel gain to be increased by the step in a case of a predetermined number of consecutive invalidity markings of the decoded forward link power control bit. Furthermore, in response to the invalidity marking, the processing unit may cause the forward link traffic channel gain to be continuously increased, either with a constant step or using a predetermined pattern for each frame.

In cellular wireless communication systems according to embodiments of the present invention, the fixed or adaptively changed value of the forward link power control bit validation threshold is set, independent of the tracking threshold. Therefore, the finger tracking performance does not affect the validation performance of the decoded forward link power control bit. Advantageously, the incorrect adjustment of the forward link traffic channel gain may be avoided.

The forward link power control bit validation may be performed by a base transceiver station. Also, a power control bit validation can be applied to a mobile station for the reverse link power control.

The present invention provides a method and an apparatus for determining whether the reverse link control bit is valid. In accordance with one aspect of the present invention, the validity of a decoded power control bit can be determined at a side of a mobile station included in a cellular wireless communication system.

In one embodiment according to the present invention, a cellular wireless communication system includes one mobile station and a plurality of base transceiver stations. For example, the mobile station is tracked by two (first and second) base transceiver stations. In the mobile station, a power control bit is decoded from a forward power control sub-channel embedded in the forward fundamental channel with respect to the first base transceiver station and a power control bit from a forward power control sub-channel embedded in the forward fundamental channel with respect to the second base transceiver station, the results that first and second decoded power control bits are obtained. Energy levels with respect to communications between the mobile station and the first base transceiver station and between the mobile station and the second base transceiver station are estimated and a first energy estimation in one power control group (PCG) and a second energy estimation in one PCG are provided.

For example, first and second power control bit validation thresholds are set and the first and second energy estimations are compared to the set first and second power control bit validation thresholds for determining whether the first and second decoded power control bits are valid. Upon the determination of the validity, the first or second decoded power control bit is selected for controlling (e.g., increasing, decreasing, maintaining) the reverse link transmission power. Advantageously, the incorrect adjustment of the reverse link traffic channel gain may be avoided. The first and second power control bit validation thresholds may be set to the same or different values and may be fixed or adaptively changed values.

In accordance with one embodiment of the present invention, there is provided a cellular communication system wherein the forward link power control bit validation is performed by the base transceiver station and the reverse link power control bit validation is performed by the mobile station.

The present invention provides a more robust method for the closed loop fast power control without negatively impacting the cell site coverage, the finger tracking ability, and the system capacity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the present invention, and it is to be understood that other embodiments may be utilized and that logical, mechanical, or electrical equivalents, and other changes may be made without departing from the scope of the present invention. The following detailed description is, therefore, not to be taken in a limiting sense, and the scope of the present invention is defined only by the appended claims.

Figure 1:
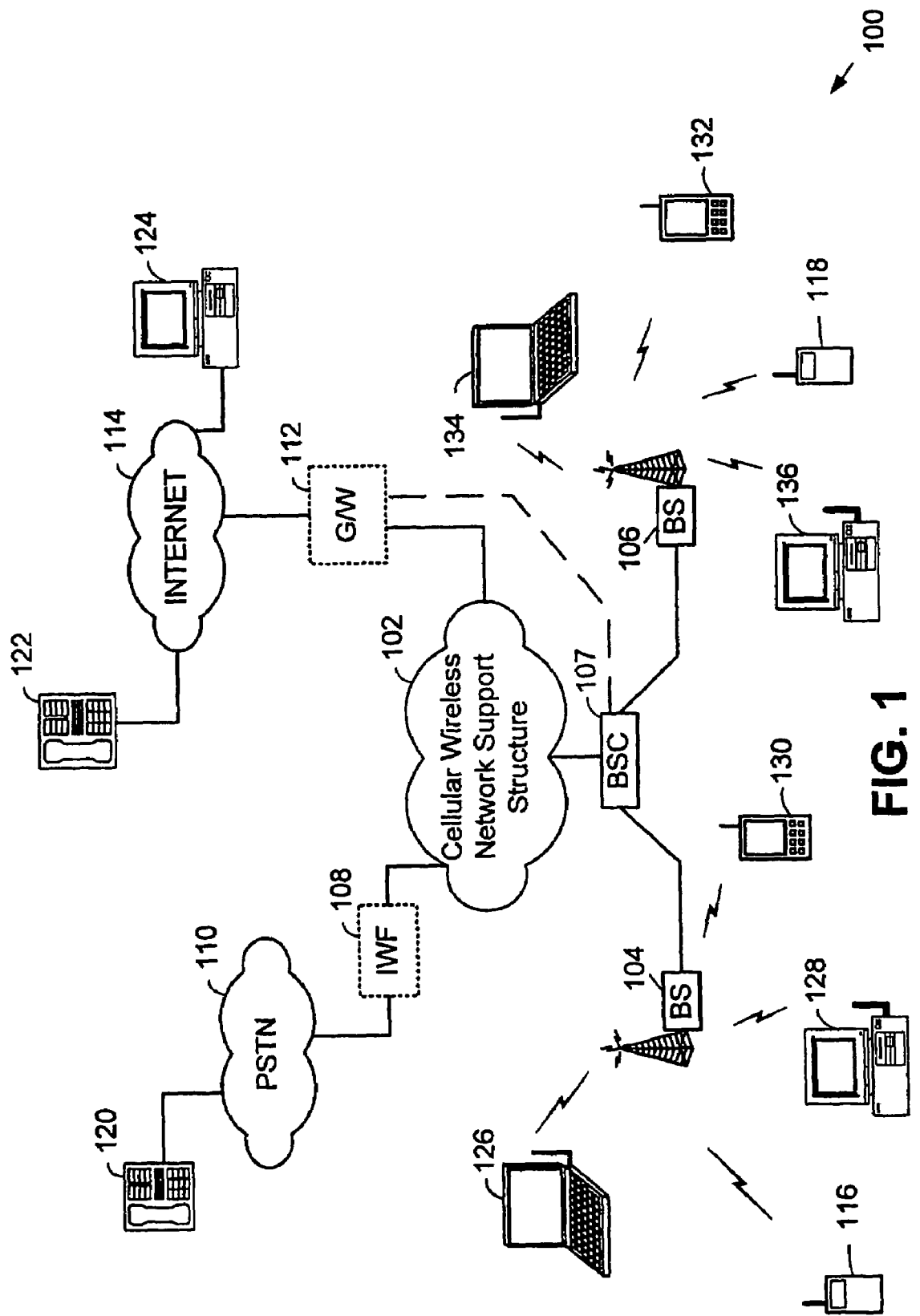
FIG. 1 is a system diagram illustrating a portion of a cellular wireless network infrastructure constructed and operating according to an embodiment of the present invention.

FIG. 1 is a system diagram illustrating a portion of a cellular wireless network infrastructure constructed and operating according to an embodiment of the present invention. The cellular wireless network infrastructure 100 includes a cellular wireless network support structure 102, a base station controller 107, and base transceiver stations (BS) 104 and 106. The cellular wireless network infrastructure 100 operates according to one or more protocol standards, e.g., IS-95A, IS-95B, 1xRTT, 1xEV-DO, 1xEV-DV, GSM, UMTS, TDMA, AMPS, ANSI-41, etc.

The cellular wireless network support structure 102 couples to the Internet 114. The cellular wireless network support structure 102 also couples to the Public Switched Telephone Network (PSTN) 110. In one embodiment of the present invention, the cellular wireless network support structure 102 is circuit switched, couples directly to the PSTN 110 (without an Inter Working Function "IWF"), and couples to the Internet 114 via a gateway (G/W) 112. In another embodiment of the present invention, the cellular wireless network support structure 102 is packet switched, couples directly to the Internet 114 (without the G/W 112), and couples to the PSTN via the IWF 108.

Cellular mobile stations 116, 118, 126, 128, 130, 132, 134, and 136 wirelessly couple to the cellular wireless network infrastructure 100 via wireless links with the base transceiver stations 104 and 106. As illustrated, the cellular mobile stations may include cellular telephones 116 and 118, laptop computers 126 and 134, desktop computers 128 and 136, and data terminals 130 and 132. However, the wireless network supports communications with other types of cellular mobile stations as well, such as hybrid PDA/phone/camera terminals and other types of mobile stations.

Each of the base transceiver stations 104 and 106 services a cell/set of sectors within which it supports wireless communications. Wireless links with the cellular mobile stations include the forward link (transmissions from a serving base transceiver station to a serviced cellular mobile station) and the reverse link (transmissions from the serviced cellular mobile station to the serving base transceiver station). The forward and reverse links support one or both of voice communications and data communications. The teachings of the present invention apply equally to any type of cellular wireless communication.

The base transceiver stations 104 and 106 and/or the base station controller 107 support reverse link recovery operations. With such reverse link recovery operations, the cellular network infrastructure 100 transmits signals to a cellular mobile station on a forward link, receives signals from the cellular mobile station on a reverse link, and monitors the quality of the reverse link. When the reverse link quality meets a reverse link lost criteria, the cellular network infrastructure 100 enters a reverse link recovery mode of operation in which the forward link transmission power is increased in an attempt to recover the reverse link. These operations may be performed by one or more servicing base transceiver stations 104 and 106 and/or the base station controller 107. When the cellular network infrastructure 100 determines that the reverse link recovery mode of operation has succeeded by the reverse link quality meeting a reverse link recovered criteria, the cellular network infrastructure 100 exits the reverse link recovery mode of operation. Further, when the cellular network infrastructure 100 determines that the reverse link recovery mode of operation has failed, the cellular network infrastructure 100 ceases forward link transmissions to the cellular mobile station.

Figure 2:
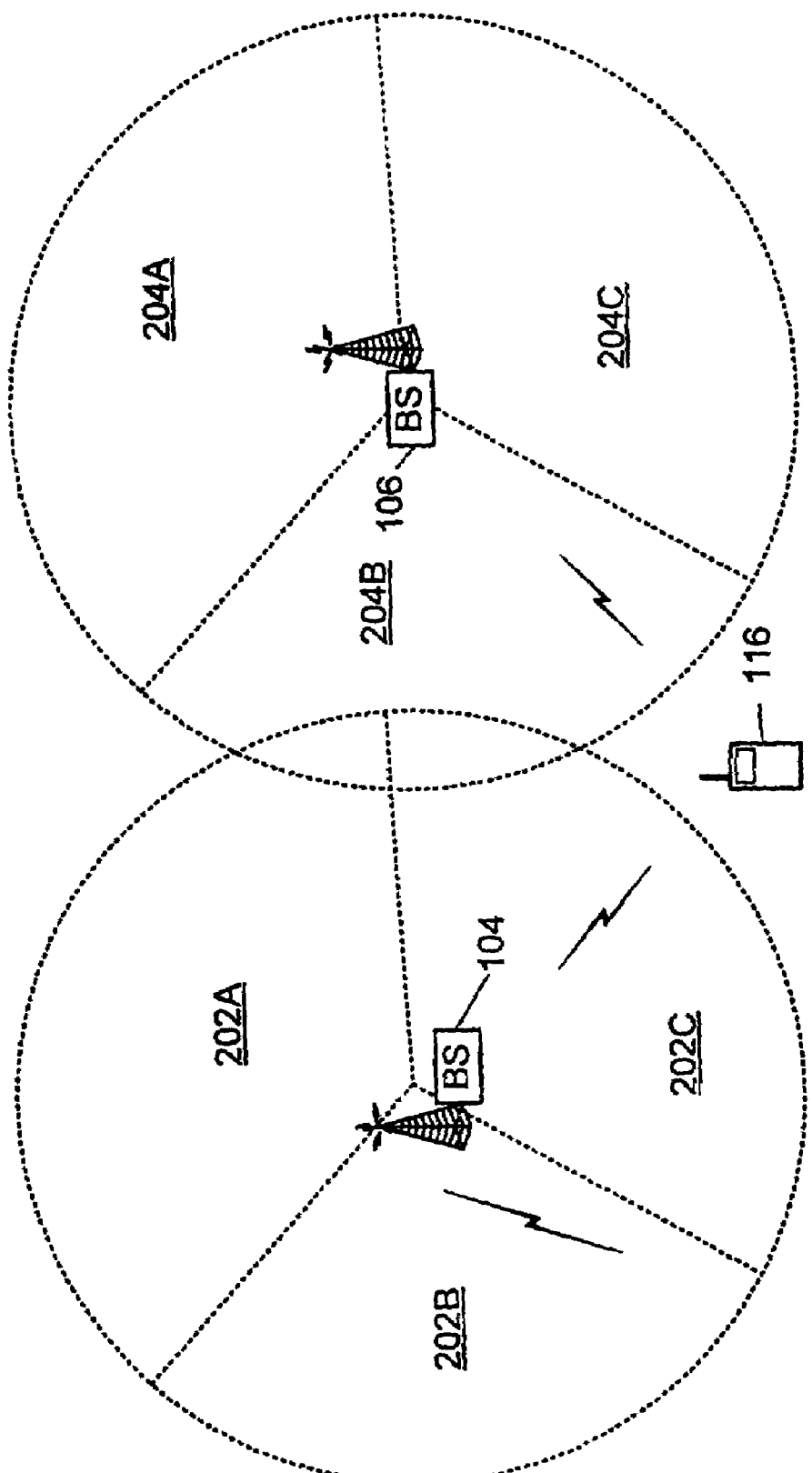
FIG. 2 is a partial system diagram illustrating a portion of the system of FIG. 1.

FIG. 2 is a partial system diagram illustrating a portion of the system of FIG. 1. Referring to FIG. 2, the base transceiver stations 104 and 106 service wireless communications for the cellular mobile station 116. The base transceiver station 104 services communications within sectors 202A, 202B, and 202C. Likewise, the base transceiver station 106 services communications within the sectors 204A, 204B, and 204C. During soft handoff, the cellular mobile station 116 receives forward link transmissions from both base transceiver stations 104 and 106 and typically occurs when the cellular mobile station 116 is moving from one cell to another. Alternatively, the cellular mobile station 116 receives forward link transmissions in multiple sectors of a common base transceiver station, e.g., the sectors 202B and 202C serviced by the base transceiver station 104. The forward link transmissions in multiple sectors may be managed in unison with the reverse link recovery mode operation.

Figure 3:
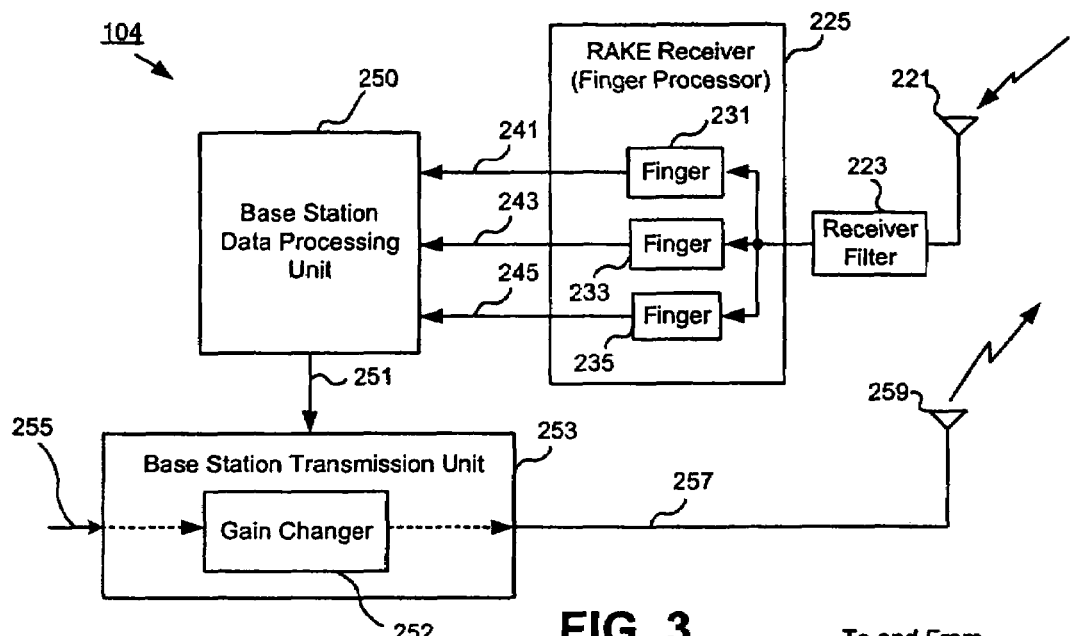
FIG. 3 is a block diagram illustrating a portion of a base transceiver station shown in FIGS. 1 and 2.

FIG. 3 shows a portion of the base transceiver station 104 (or base transceiver station 106) with a particular reference to the power control feature. The base transceiver station 104 communicates with the mobile stations as shown in FIGS. 1 and 2. In the following discussion, the mobile station is represented by the cellular mobile station 116 and the "mobile station 116" is applicable to any of the other cellular mobile stations 118, 126, 128, 130, 132, 134, and 136 wirelessly couple to the cellular wireless network infrastructure 100 via wireless links with the base transceiver stations. Also, the "base transceiver station 104" is applicable to another base transceiver station that communicates with the base station controller 107.

Referring to FIGS. 1, 2 and 3, a signal received through a receiver antenna 221 from the mobile station 116 is filtered by a receiver filter 223 and it provides a filtered signal to a finger processor 225 formed by a RAKE receiver. The finger processor 225 includes a plurality of fingers, for example, three fingers 231, 233 and 235. The finger processor 225 allows signals arriving with different propagation delays to be received separately. The fingers 231, 233 and 235 of the finger processor 225 produce data signals 241, 243 and 245, respectively, that represent data symbols and others. The data signals 241, 243 and 245 are fed to a base station data processing unit 250 and thus, the base station data processing unit 250 receives data symbols and pilot symbols. Based on the received symbols, the base station data processing unit 250 performs operations of mobile tracking and power control, among others.

Based on the received symbols, the base station data processing unit 250 generates a signal 251 representing a power control command that is fed to a base station transmission unit 253. In response to the power control command, a gain changer 252 of the base station transmission unit 253 controls power for transmitting a forward link traffic data represented by a signal 255. A power controlled signal 257 is fed to a transmission antenna 259 and transmitted to the mobile station 116. Also, under control by the base station data processing unit 250, the base station transmission unit 253 provides a reverse link power control bit that is transmitted to the mobile station 116 for controlling the reverse link power in the mobile station 116.

Figure 4:
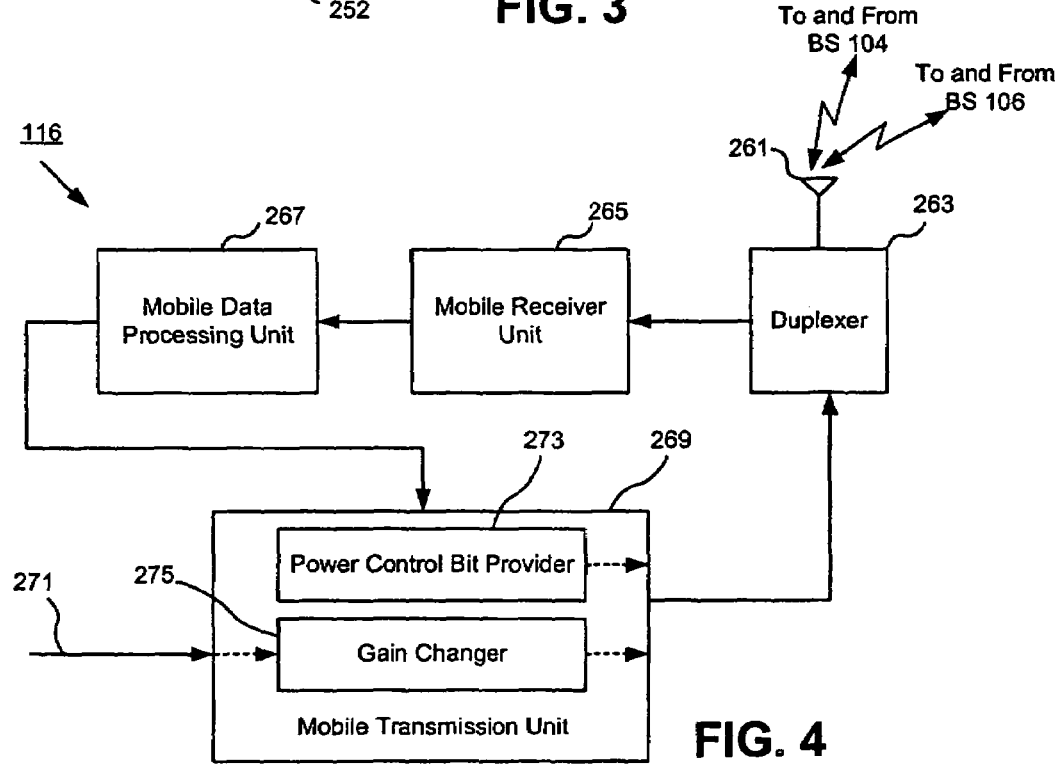
FIG. 4 is a block diagram illustrating a portion of a mobile station shown in FIGS. 1 and 2.

FIG. 4 shows a portion of the mobile station 116 shown in FIGS. 1 and 2. Referring to FIGS. 1, 2 and 4, the mobile station 116 includes an antenna 261 that transmits signals to and receives signals from the base transceiver stations 104 and 106. A duplexer 263 provides a forward link channel or signal from the base transceiver stations 104 and 106 to a mobile receiver unit 265. The mobile receiver unit 265 demodulates and decodes the received signal. The mobile receiver unit 265 then provides a measured signal-to-noise ratio (S/N), a measured received power and a symbol error rate, among others, to a mobile data processing unit 267. The mobile data processing unit 267 calculates energy per bit ($E_b$) or energy per symbol ($E_s$) based on the forward power control sub-channel signal in one power control group (PCG) and produces a power control message that indicates a change in power for the forward link signal. The power control message is a binary value, where a "1" value requests the base transceiver station 104 or 106 to increase the forward link traffic channel gain of the forward link signal, while a "0" value requests that the forward link traffic channel gain of the forward link signal be decreased.

A mobile transmission unit 269 encodes and modulates the reverse link traffic data represented by a signal 271 that corresponds to voice data from a user of the mobile station 116. The encoded and modulated data in a reverse link frame is provided to the duplexer 263 and transmitted to the base transceiver station 104 or 106. The mobile transmission unit 269 also includes a gain changer 275 for changing the reverse link transmission power under the control by the mobile data processing unit 267.

A mobile transmission unit 269 includes a power control bit provider 273 that provides the forward link power control message in a predetermined location of the reverse link pilot signal.

Again referring to FIG. 3, the receiver antenna 221 of the base transceiver station 104 receives the reverse link frames from the mobile station 116, the frames including the forward link power control messages from the mobile station 116. The finger processor 225 and the base station data processing unit 250 decodes the forward link power control message embedded in the reverse link pilot of each PCG and a forward link transmitter power control signal (the signal 251) is provided to the base station transmission unit 253. In response to the signal 251, the base station transmission unit 253 increases, decreases or maintains the power of the forward link signal. The forward link signal of the forward link traffic data is then transmitted through the transmission antenna 259 to the mobile station 116. The base station transmission unit 253 encodes and modulates the forward link traffic data.

Again referring to FIGS. 1 and 2, with respect to the frames, the forward link traffic channel gain of the base transceiver station 104 varies over time based on the power control commands reported by the serviced cellular mobile station. As is generally known, in conventional reverse link closed loop power control operations, the cellular mobile station reports the power control commands based on the received strength of forward link signals. Likewise, the cellular network infrastructure 100 measures the strength of the received reverse link signals from the cellular mobile station. Based upon these measured strengths, the cellular network infrastructure (the base transceiver station 104 or 106 and/or the base station controller 107) adjusts the forward link transmission power and also produces reverse link power control bits and transmits these power control bits to the cellular mobile station.

In the embodiment according to the present invention, the base station data processing unit 250 shown in FIG. 3 has an additional threshold for determining the validity of the power control bit for the forward link power control. The additional threshold is a forward link power control bit validation threshold and is independent of the finger lock thresholds. In the embodiment, there are three examples of the forward link power control bit validation methods with respective forward link power control bit validation thresholds.

Figure 5A:
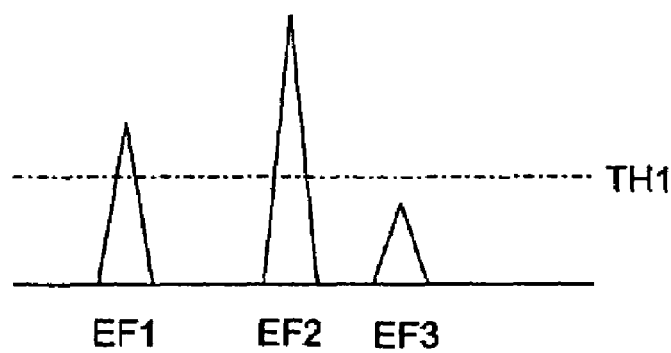
FIG. 5A illustrates an operation of the forward link power control bit validation based on individual finger energies and a forward link power control bit validation threshold.
Figure 5B:
FIG. 5B illustrates an operation of the forward link power control bit validation based on summed finger energies and a forward link power control bit validation threshold.
Figure 5C:
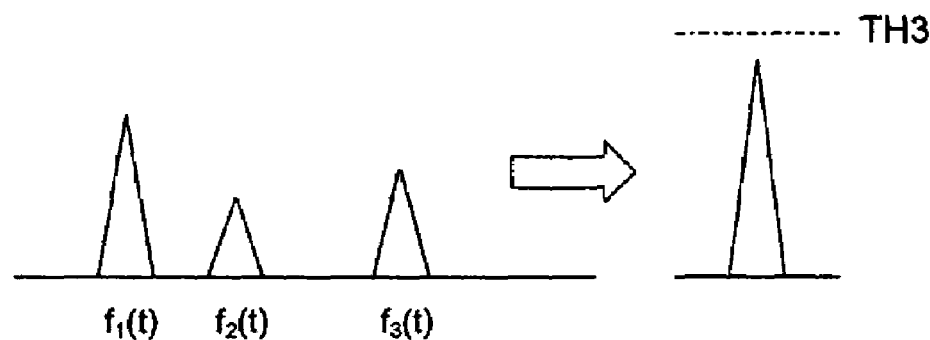
FIG. 5C illustrates an operation of the forward link power control bit validation based on combined power control portions and a forward link power control bit validation threshold.
Figure 6A:
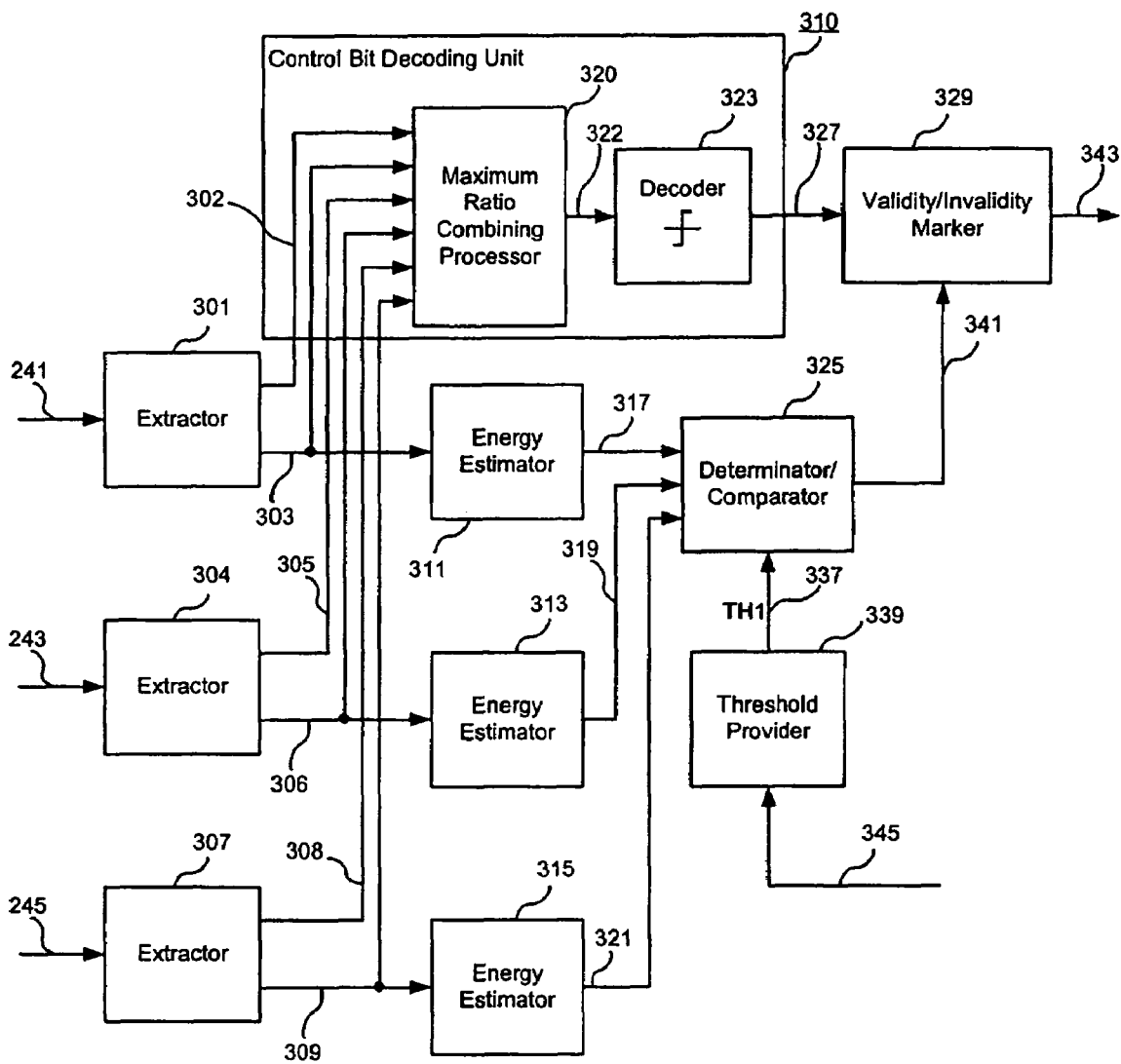
FIG. 6A is a block diagram illustrating a portion of a base station data processing unit shown in FIG. 3, which performs the operation of the forward link power control bit validation shown in FIG. 5A.
Figure 6B:
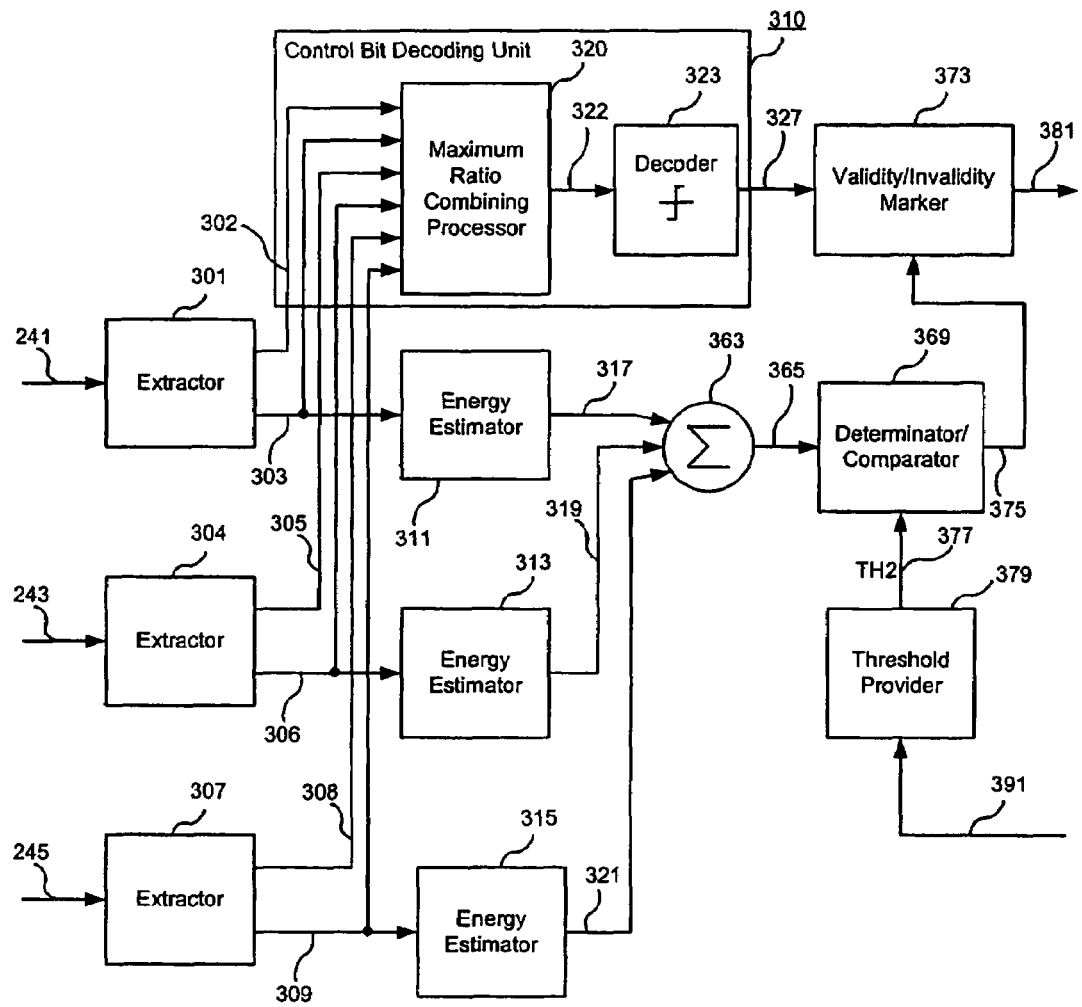
FIG. 6B is a block diagram illustrating a portion of the base station data processing unit shown in FIG. 3, which performs the operation of the forward link power control bit validation shown in FIG. 5B.
Figure 6C:
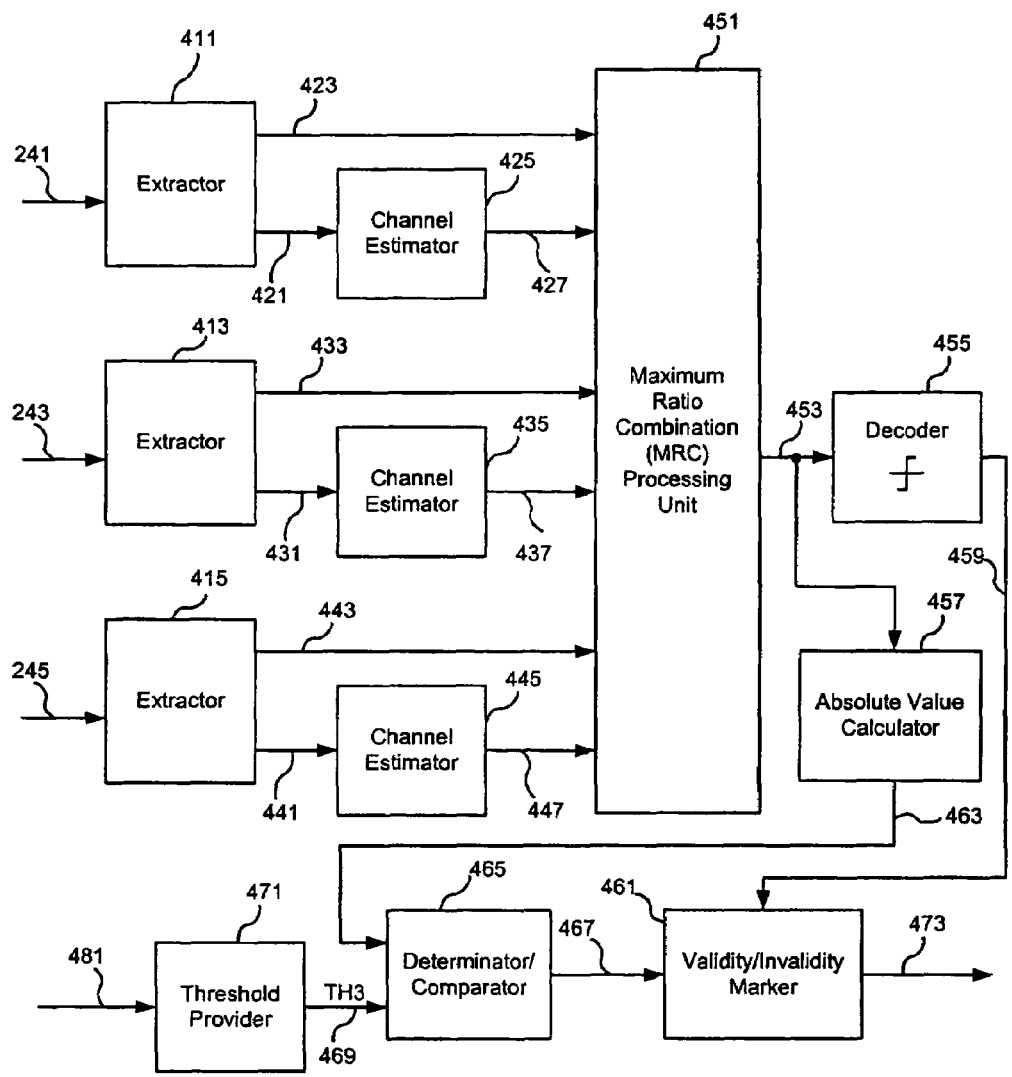
FIG. 6C is a block diagram illustrating a portion of the base station data processing unit shown in FIG. 3, which performs the operation of the forward link power control bit validation shown in FIG. 5C.

FIGS. 5A, 5B and 5C show forward link power control bit validation methods based on individual finger energies, summed finger energies and combined power control portions, respectively. FIGS. 6A, 6B and 6C show the base station data processing unit 250 performing the operations of the forward link power control bit validation methods shown in FIGS. 5A, 5B and 5C, respectively.

Referring to FIGS. 1, 2, 3 and 6A, the data signals 241, 243 and 245 from the finger processor 225 are fed to extractors 301, 304 and 307, respectively. The extractor 301 extracts the data fed thereto and provides a power control bit signal 302 and a pilot portion signal 303 that are fed to a control bit decoding unit 310 which includes a maximum ratio combining processor 320 and a decoder 323. Similarly, the extractor 304 extracts the data fed thereto and provides a power control bit signal 305 and a pilot portion signal 306 that are fed to the maximum ratio combining processor 320 of the control bit decoding unit 310. The extractor 307 extracts the data fed thereto and provides a power control bit signal 308 and a pilot portion signal 309 that are fed to the maximum ratio combining processor 320. The maximum ratio combining processor 320 produces a maximum ratio combination signal 322. In response to the maximum ratio combination signal 322, the decoder 323 compares its Maximum Ratio Combination (MRC) data to a predefined threshold and produces a decoded signal 327 having a decoded forward link power control bit in one power control group (PCG). The decoded signal 327 having a binary value "1" or "0" is fed to a validity/invalidity marker 329. A detail of the maximum ratio combining processor 320 will be described later in conjunction with FIG. 7.

The pilot portion signal 303 from the extractor 301 is fed to an energy estimator 311 which in turn produces a finger energy signal 317. Similarly, the pilot portion signal 306 is fed to an energy estimator 313 which in turn produces a finger energy signal 319. The pilot portion signal 309 is fed to an energy estimator 315 which in turn produces a finger energy signal 321. The finger energy signals 317, 319 and 321 are fed to a determinator/comparator 325. The determinator/comparator 325 provides a validity/invalidity signal 341 to the validity/invalidity marker 329, in response to a threshold signal 337 fed by a threshold provider 339. The validity/invalidity marker 329 provides a power control command signal 343. A threshold instruction signal 345 is fed to the threshold provider 339 in response to the base station controller 107.

FIG. 6B depicts a portion of the base station data processing unit 250, the configuration of which is similar to that of FIG. 6A with an addition of a combiner 363. Referring to FIGS. 6B, 1, 2 and 3, the data signals 241, 243 and 245 are fed to the extractors 301, 304 and 307, respectively. The extractors 301, 304 and 307 extract the data fed thereto and provide the power control bit signal 302 and the pilot portion signal 303, the power control bit signal 305 and the pilot portion signal 306, and the power control bit signal 308 and the pilot portion signal 309, respectively. Those power control bit signals and pilot portion signals are fed to the control bit decoding unit 310 having the maximum ratio combining processor 320 and the decoder 323. The maximum ratio combining processor 320 produces the maximum ratio combination signal 322. In response to the maximum ratio combination signal 322, the decoder 323 produces the decoded signal 327 having the decoded forward link power control bit in one power control group (PCG). The decoded signal 327 is fed to a validity/invalidity marker 373.

The pilot portion signals 303, 306 and 309 from the extractors 301, 304 and 307 are fed to the energy estimators 311, 313 and 315, respectively, that produce the finger energy signals 317, 319 and 321, respectively. The finger energy signals 317, 319 and 321 are fed to the combiner 363 which in turn provides a combined signal 365 to a determinator/comparator 369. The determinator/comparator 369 provides a validity/invalidity signal 375 to the validity/invalidity marker 373, in response to a threshold signal 377 fed by a threshold provider 379. The validity/invalidity marker 373 produces a power control command signal 381. A threshold instruction signal 391 is fed to the threshold provider 379 in response to the base station controller 107.

Referring to FIGS. 1, 2, 3 and 6C, the data signals 241, 243 and 245 are fed to extractors 411, 413 and 415, respectively. The extractor 411 produces a pilot portion signal 421 and a power control bit signal 423. The pilot portion signal 421 is fed to a channel estimator 425 which in turn produces a channel estimate 427. Similarly, the extractor 413 produces a pilot portion signal 431 and a power control bit signal 433. The pilot portion signal 431 is fed to a channel estimator 435 which in turn produces a channel estimate 437. The extractor 415 produces a pilot portion signal 441 and a power control bit signal 443. The pilot portion signal 441 is fed to a channel estimator 445 which in turn produces a channel estimate 447.

The channel estimates 427, 437 and 447 and the power control bit signals 423, 433 and 443 are fed to a maximum ratio combination processing unit 451 which in turn provides a combined signal 453 to a decoder 455 and an absolute value calculator 457. The decoder 455 compares Maximum Ratio Combination (MRC) data represented by the combined signal 453 to a predefined threshold and produces a decoded signal 459 representing a decoded forward link power control bit in one power control group (PCG). The decoded signal 459 having a binary value "1" or "0", which is fed to a validity/invalidity marker 461. The absolute value calculator 457 provides an absolute value signal 463 having the absolute value of the MRC data to a determinator/comparator 465. The determinator/comparator 465 provides a validity/invalidity signal 467, in response to a threshold signal 469 provided by a threshold provider 471. The validity/invalidity marker 461 produces a power control command signal 473 based on the decoded signal 459 and the validity/invalidity signal 467. A threshold instruction signal 481 is fed to the threshold provider 471 in response to the base station controller 107.

Figure 7:
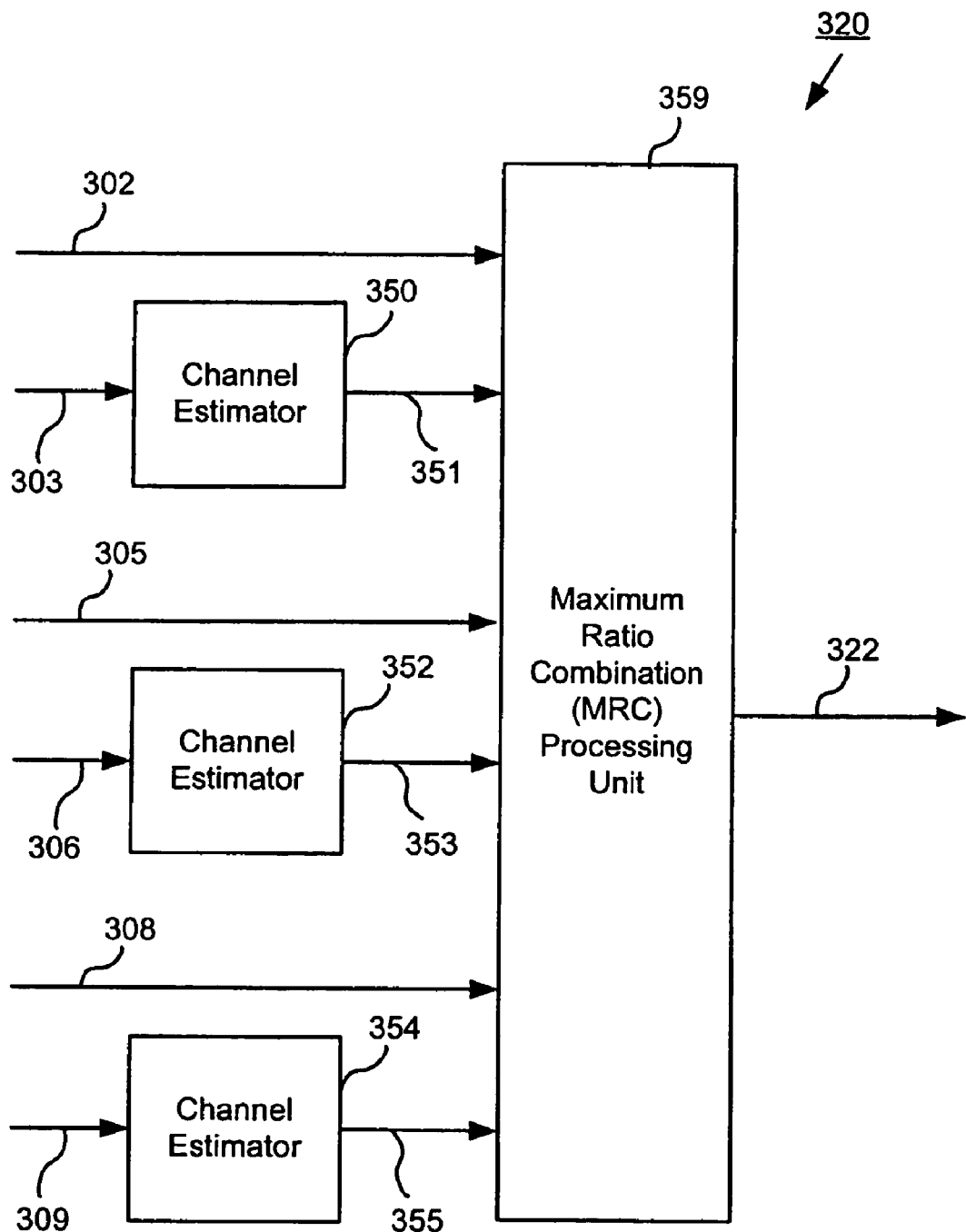
FIG. 7 is a block diagram illustrating a portion of a maximum ratio combining processor shown in FIGS. 6A and 6B.

FIG. 7 shows a detail of the maximum ratio combining processor 320 of FIGS. 6A and 6B. Referring to FIG. 7, the power control bit signals 302, 305 and 308 are fed to a maximum ratio combination processing unit 359. The pilot portion signal 303 is fed to a channel estimator 350 which in turn produces a channel estimate 351. Similarly, the pilot portion signal 306 is fed to a channel estimator 352 which in turn produces a channel estimate 353. The pilot portion signal 309 is fed to a channel estimator 354 which in turn produces a channel estimate 355. The channel estimates 351, 353 and 355 are fed to the 359 which in turn produces the maximum ratio combination signal 322.

The maximum ratio combination processing unit 359 obtains de-spreaded finger signals $f_1(t)$, $f_2(t)$ and $f_3(t)$ based on the forward link power control bit portion embedded in the reverse pilot channel in one power control group (PCG) with respect to the data signals 241, 243 and 245 shown in FIG. 3, respectively, and combines all de-spreaded finger signals $f_1(t)$, $f_2(t)$ and $f_3(t)$ in the forward link power control bit portion of that PCG. The forward link power control bit portions embedded on the reverse pilot channels of all locked fingers are coherently combined in accordance with maximum ratio combination (MRC) to obtain the soft power control bit (usually one PCG contains one power control bit). For example, the MRC is performed using a formula $f_1(t)c_1(t) + f_2(t)c_2(t) + f_3(t)c_3(t)$, where $c_1(t)$, $c_2(t)$ and $c_3(t)$ are conjugates of channel estimates for the three fingers, respectively.

Figure 8A:
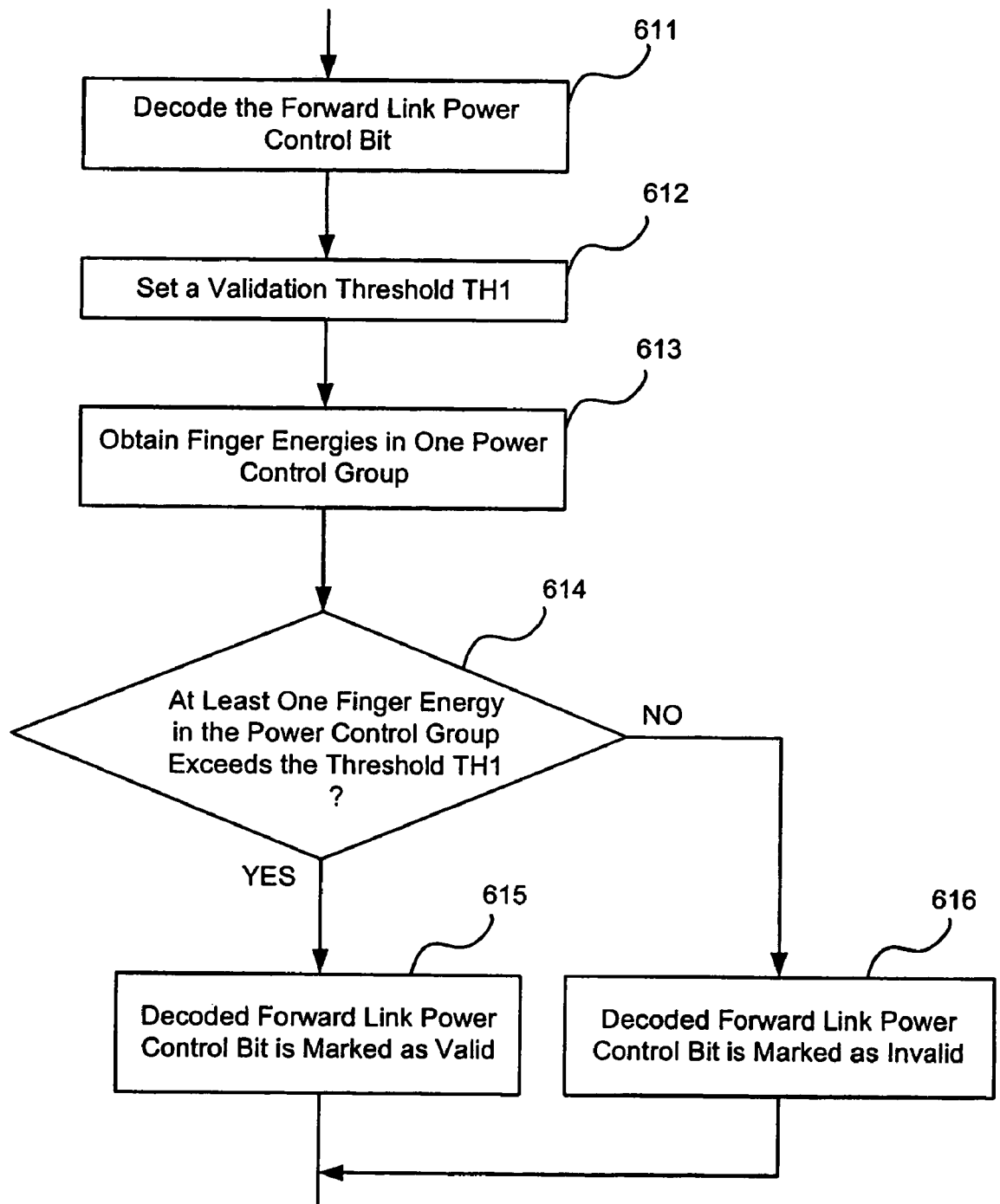
FIG. 8A is a flowchart illustrating a method for determining validity of the power control bit in accordance with the forward link power control bit validation shown in FIG. 5A.

FIG. 8A is a flowchart illustrating a method for determining validity of the forward link power control bit in accordance with the power control bit validation shown in FIG. 5A. Shown in FIGS. 5A, 6A and 8A is a forward link power control bit validation method wherein the energies of two fingers are above the forward link power control bit validation threshold.

Referring to FIGS. 3, 5A, 6A, 7 and 8A, the base station data processing unit 250 of the base transceiver station 104 performs the operation of power control in response to the data signals 241, 243 and 245. The extractor 301 extracts the data represented by the data signal 241 and provides a power control bit portion and a pilot portion which are represented by the power control bit signal 302 and the pilot portion signal 303, respectively. Similarly, the extractor 304 extracts the data represented by the data signal 243 and provides a power control bit portion and a pilot portion which are represented by the power control bit signal 305 and the pilot portion signal 306, respectively. The extractor 307 extracts the data represented by the data signal 245 and provides a power control bit portion and a pilot portion which are represented by the power control bit signal 308 and the pilot portion signal 309, respectively.

The maximum ratio combining processor 320 provides the maximum ratio combination signal 322 based on the data represented by the power control bit signals 302, 305 and 308 and the pilot portion signals 303, 306 and 309. The MRC data of the maximum ratio combination signal 322 is compared to the predefined decoding threshold. The decoder 323 decodes the forward link power control bit and provides a decoded forward link power control bit (a digital signal "0" or "1") represented by the decoded signal 327 (step 611).

In response to the pilot portion signals 303, 306 and 309, the energy estimators 311, 313 and 315 provide finger energies EF1, EF2 and EF3, respectively. The threshold provider 339 sets the forward link power control bit validation threshold to a value TH1 and the threshold signal 337 representing the value TH1 is fed to the determinator/comparator 325 (step 612). The determinator/comparator 325 receives the finger energies EF1, EF2 and EF3 in one power control group (PCG) from the energy estimators 311, 313 and 315 (step 613). The finger energies EF1, EF2 and EF3 are obtained with respect to the data signals 241, 243 and 245, respectively. It is noted that the set value TH1 of the forward link power control bit validation threshold is independent of the finger lock thresholds. In the embodiment, the value TH1 is greater than the in-lock and out-lock thresholds.

Next, the determinator/comparator 325 compares the finger energies EF1, EF2 and EF3 to the set forward link power control bit validation threshold TH1 to determine whether the decoded forward link power control bit is valid (step 614). The compared and determined resultant is provided with the validity/invalidity signal 341 to the validity/invalidity marker 329. In a case where at least one finger energy or equivalently Ec/Io (the ratio of signal energy per bit to the interference power spectral density) is above the forward link power control bit validation threshold TH1 (positive determination in step 614), the decoded forward link power control bit is determined as valid and marked accordingly (step 615). Otherwise, the decoded forward link power control bit is determined as invalid and marked accordingly (step 616). The decoded forward link power control bit and its validity or invalidity mark are provided with the power control command signal 343 as information on power control (increase, decrease or maintaining) by the base station transmission unit 253. The validity condition in step 614 may be changed. For example, the decoded forward link power control bit will be determined as valid, if more than one finger energy or a majority number of finger energies in one power control group (PCB) exceed the forward link power control bit validation threshold TH1.

Figure 8B:
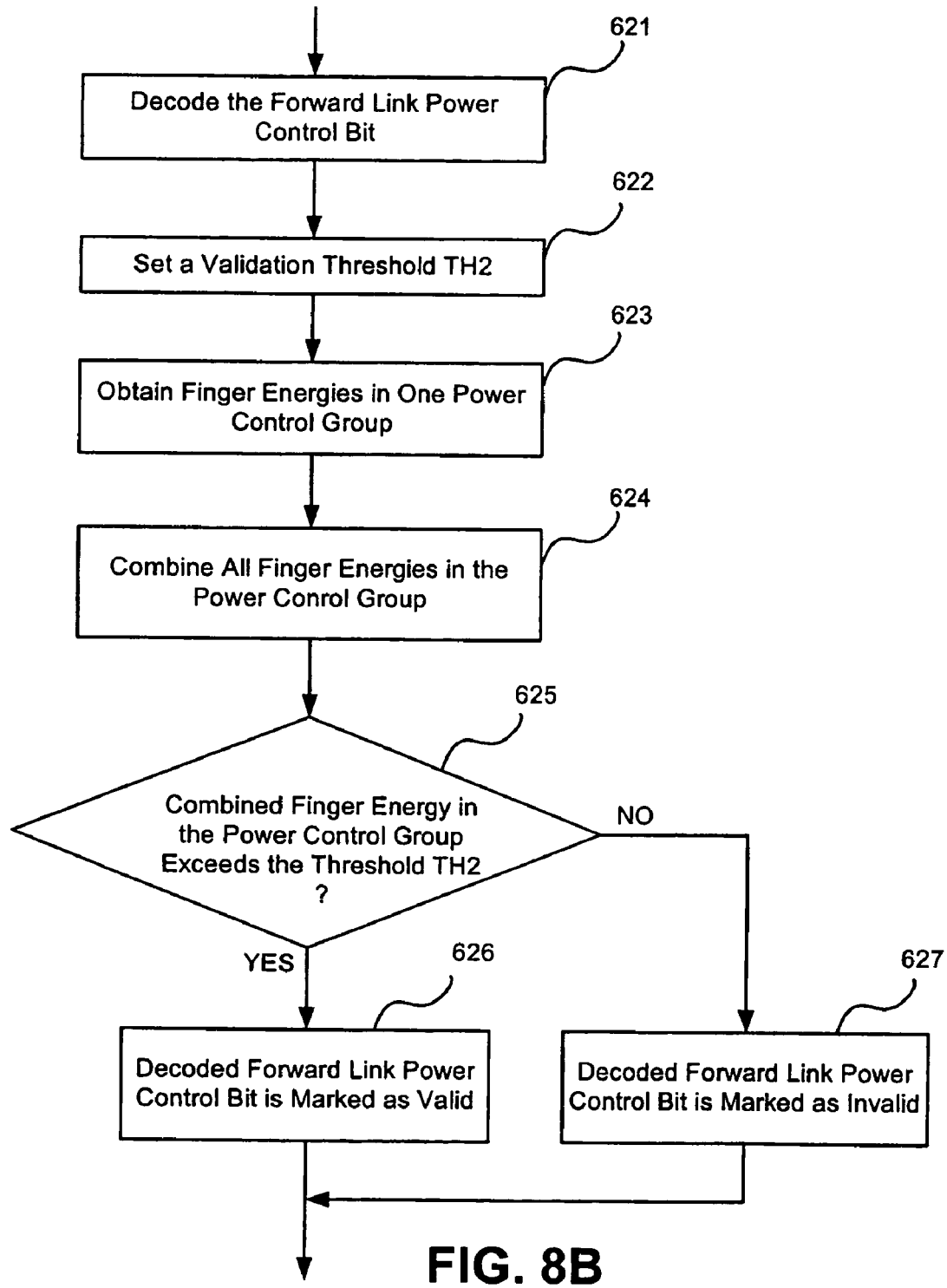
FIG. 8B is a flowchart illustrating a method for determining validity of the power control bit in accordance with the forward link power control bit validation shown in FIG. 5B.

FIG. 8B is a flowchart illustrating a method for determining validity of the forward link power control bit in accordance with the forward link power control bit validation shown in FIG. 5B. Shown in FIGS. 5B and 8B is a forward link power control bit validation method wherein the combined or summed finger energies in one power control group or equivalently Ec/Io estimate in one power control group (which will be used for the reverse link power control) is above the forward link power control bit validation threshold.

Referring to FIGS. 3, 5B, 6B, 7 and 8B, the base station data processing unit 250 performs the operation of power control in response to the data signals 241, 243 and 245. The extractor 301 extracts the data represented by the data signal 241 and provides a power control bit portion and a pilot portion which are represented by the power control bit signal 302 and the pilot portion signal 303, respectively. Similarly, the extractor 304 extracts the data represented by the data signal 243 and provides a power control bit portion and a pilot portion which are represented by the power control bit signal 305 and the pilot portion signal 306, respectively. The extractor 307 extracts the data represented by the data signal 245 and provides a power control bit portion and a pilot portion which are represented by the power control bit signal 308 and the pilot portion signal 309, respectively.

The maximum ratio combining processor 320 provides the maximum ratio combination signal 322 based on the data represented by the power control bit signals 302, 305 and 308 and the pilot portion signals 303, 306 and 309. The MRC data of the maximum ratio combination signal 322 is compared to the predefined decoding threshold. The decoder 323 decodes the forward link power control bit and provides a decoded forward link power control bit (a digital signal "0" or "1") represented by the decoded signal 327 (step 621).

In response to the pilot portion signals 303, 306 and 309, the energy estimators 311, 313 and 315 provide finger energies EF1, EF2 and EF3, respectively. The threshold provider 379 sets the forward link power control bit validation threshold to a value TH2 and the threshold signal 377 representing the value TH2 is fed to the determinator/comparator 369 (step 622). It is noted that the set value TH2 of the forward link power control bit validation threshold is independent of the finger lock thresholds. In the embodiment, the value TH2 is greater than the in-lock and out-lock thresholds.

The combiner 363 receives the finger energies EF1, EF2 and EF3 in one power control group (PCG) from the energy estimators 311, 313 and 315 (step 623). The finger energies EF1, EF2 and EF3 are obtained with respect to the data signals 241, 243 and 245, respectively. All the finger energies EF1, EF2 and EF3 in one power control group are combined or summed by the combiner 363 (step 624) and the combined finger energies (EF1+EF2+EF3) represented by the combined signal 365 is provided to the determinator/comparator 369. The determinator/comparator 369 compares the combined finger energies (EF1+EF2+EF3) to the set forward link power control bit validation threshold TH2 to determine whether the decoded forward link power control bit is valid (step 6250). The compared and determined resultant is provided with the determinator/comparator 369 to the validity/invalidity marker 373. In a case of the combined finger energies exceeding the threshold TH2 (positive determination in step 625), the decoded forward link power control bit is determined as valid and marked accordingly (step 626). Otherwise, the decoded forward link power control bit is determined as invalid and marked accordingly (step 627). The decoded forward link power control bit and its validity or invalidity mark are provided with the validity/invalidity marker 373 as information on power control (increase, decrease or maintaining) by the base station transmission unit 253.

Figure 8C:
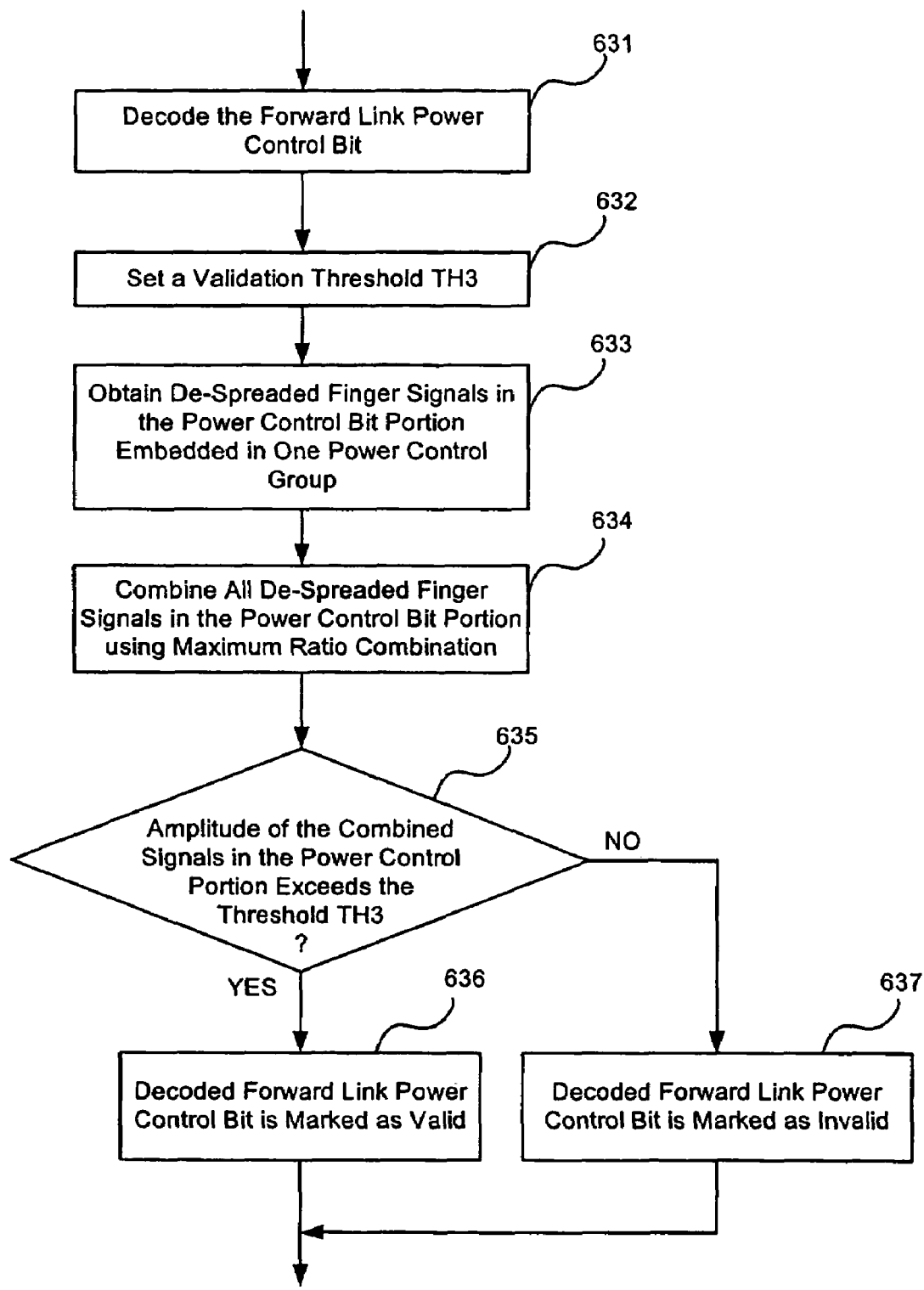
FIG. 8C is a flowchart illustrating a method for determining validity of the power control bit in accordance with the forward link power control bit validation shown in FIG. 5C.

FIG. 8C is a flowchart illustrating a method for determining validity of the power control bit in accordance with the forward link power control bit validation shown in FIG. 5C. Shown in FIGS. 5C and 8C is a forward link power control bit validation method wherein a coherently combined signal amplitude derived from the forward link power control bit portion embedded in reverse pilot channel in one power control group is above the forward link power control bit validation threshold.

Referring to FIGS. 3, 5C, 6C and 8C, the base station data processing unit 250 performs the operation of power control in response to the data signals 241, 243 and 245. The extractor 411 extracts the data represented by the data signal 241 and provides a power control bit portion and a pilot portion which are represented by the pilot portion signal 421 and the power control bit signal 423, respectively. Similarly, the extractor 413 extracts the data represented by the data signal 243 and provides a power control bit portion and a pilot portion which are represented by the pilot portion signal 431 and the power control bit signal 433, respectively. The extractor 415 extracts the data represented by the data signal 245 and provides a power control bit portion and a pilot portion which are represented by the pilot portion signal 441 and the power control bit signal 443, respectively.

In response to the pilot portion signal 421, the channel estimator 425 performs the channel estimation of the pilot portion data included in the data signal 241. Similarly, the channel estimators 435 and 445 perform the channel estimation of the pilot portion data included in the data signal 243 and 245, respectively. The channel estimations represented by the channel estimates 427, 437 and 447 are fed to the maximum ratio combination processing unit 451 that receives the pilot portion data included in the data signals 241, 243 and 245 represented by the power control bit signals 423, 433 and 443, respectively. The maximum ratio combination processing unit 451 provides the combined signal 453 having MRC data. In response to the combined signal 453, the MRC data thereof is compared to the predefined decoding threshold by the decoder 455. Thus, the decoder 455 decodes the forward link power control bit and provides a decoded forward link power control bit (a digital signal "0" or "1") represented by the decoded signal 459 (step 631).

The threshold provider 471 sets the forward link power control bit validation threshold to a value TH3 (step 632). It is noted that the set value TH3 of the forward link power control bit validation threshold is independent of the finger lock thresholds. In the embodiment, the value TH3 is greater than the in-lock and out-lock thresholds.

The maximum ratio combination processing unit 451 obtains de-spreaded finger signals $f_1(t)$, $f_2(t)$ and $f_3(t)$ based on the forward link power control bit portion embedded in the reverse pilot channel in one power control group (PCG) with respect to the data signals 241, 243 and 245, respectively (step 633) and combines all de-spreaded finger signals $f_1(t)$, $f_2(t)$ and $f_3(t)$ in the forward link power control bit portion of that PCG (step 634). Here, the forward link power control bit portions embedded on the reverse pilot channels of all locked fingers are coherently combined in accordance with maximum ratio combination (MRC) to obtain the soft power control bit (usually one PCG contains one power control bit).

In response to the combined signal 453, the absolute value calculator 457 obtains the absolute value of the combined finger energies and it is compared to the forward link power control bit validation threshold TH3 by the determinator/comparator 465 (step 635). In a case where the absolute value of the combined finger energies exceeds the forward link power control bit validation threshold TH3 (positive determination in step 636), the decoded forward link power control bit is determined as valid and marked by the validity/invalidity marker 461 accordingly (step 636). Otherwise, the decoded forward link power control bit is determined as invalid and marked by the validity/invalidity marker 461 accordingly (step 637). The decoded forward link power control bit and its validity or invalidity mark are provided with the power control command signal 473 as information on power control (increase, decrease or maintaining) by the base station transmission unit 253.

In an example shown in FIG. 5C, an MRC is performed using a formula $f_1(t)c_1(t)+f_2(t)c_2(t)+f_3(t)c_3(t)$, where $c_1(t)$, $c_2(t)$ and $c_3(t)$ are conjugates of channel estimates for the three fingers, respectively. The amplitude of the combined signal is lower than the threshold TH3, thus the decoded power control bit is declared and marked as invalid in step 637.

When the decoded forward link power control bit is marked as invalid, the base transceiver station 104 either increases the forward link traffic channel gain or keeps it the same as before based on the predefined power control patterns.

In a case of the invalidity being marked by the validity/invalidity marker 329 (of FIG. 6A) in step 616 (in FIG. 8A), the gain changer 252 of the base station transmission unit 253 (of FIG. 3) changes or keeps the forward link traffic channel gain, in response to the power control command signal 343. Similarly, in a case of the invalidity being marked by the validity/invalidity marker 373 (of FIG. 6B) in step 627 (in FIG. 8B), in response to the power control command signal 381, the gain changer 252 changes or keeps the forward link traffic channel gain. In a case of the invalidity being marked by the validity/invalidity marker 461 (of FIG. 6C) in step 637 (in FIG. 8C), in response to the power control command signal 473, the gain changer 252 of the base station transmission unit 253 changes or keeps the forward link traffic channel gain. Examples of the possible power control patterns will be described with reference to FIGS. 9A-9D that illustrate controlling the forward link traffic channel gain in accordance with the determination of validity of the power control bit.

Figure 9A:
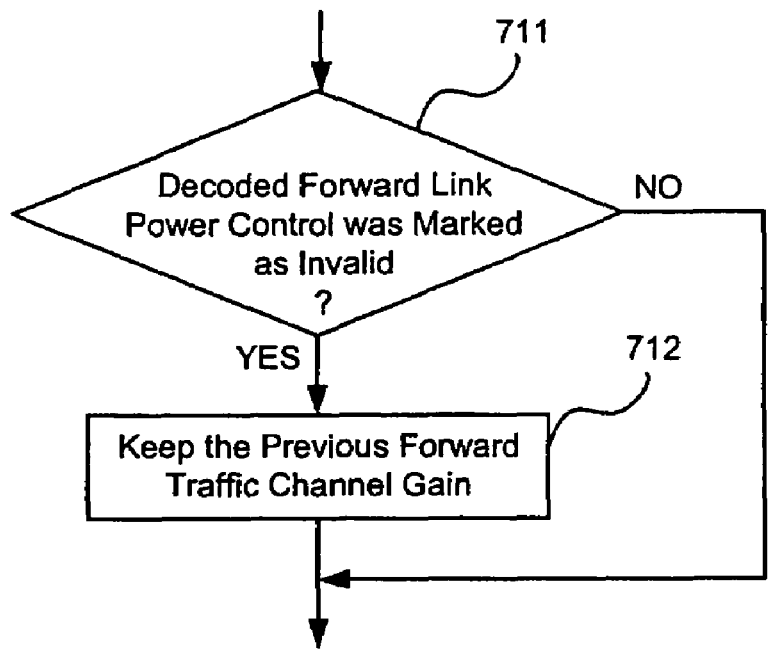
FIG. 9A is a flowchart illustrating a method for maintaining a forward link traffic channel gain following the determinations of invalidity of the power control bit in accordance with the methods shown in FIGS. 8A-8C.

Referring to FIGS. 3 and 9A, the base station data processing unit 250 of the base transceiver station 104 determines whether the decoded forward link power control bit was marked as invalid (step 711). In a case where the decoded forward link power control bit is invalid (positive determination in step 711), the base station data processing unit 250 keeps the previous forward link traffic channel gain (step 712). Otherwise, the base station data processing unit 250 performs depending upon the decoded forward link power control bit.

Figure 9B:
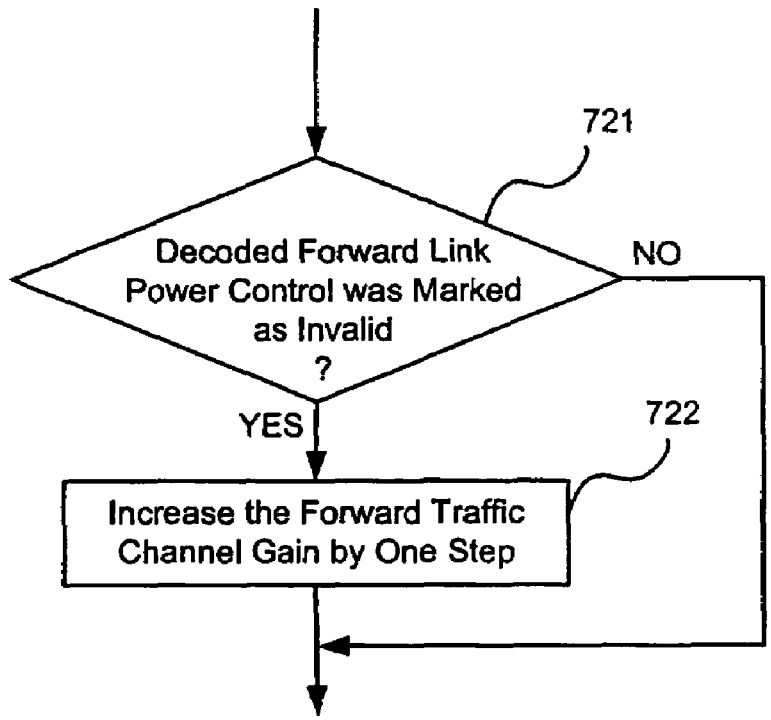
FIG. 9B is a flowchart illustrating a method for increasing a forward link traffic channel gain following the determination of invalidity of the power control bit in accordance with any of the methods shown in FIGS. 8A-8C.

Referring to FIGS. 3 and 9B, the base station data processing unit 250 determines whether the decoded forward link power control bit was marked as invalid (step 721). In a case where the decoded forward link power control bit is invalid (positive determination in step 721), the gain changer 252 increases the forward link traffic channel gain by one step (step 722). The value of the gain step is predetermined with communication conditions. In a case where the power control bit is valid (negative determination in step 721), the base station data processing unit 250 adjusts the forward link traffic channel gain based on the decoded forward link power control command.

Figure 9C:
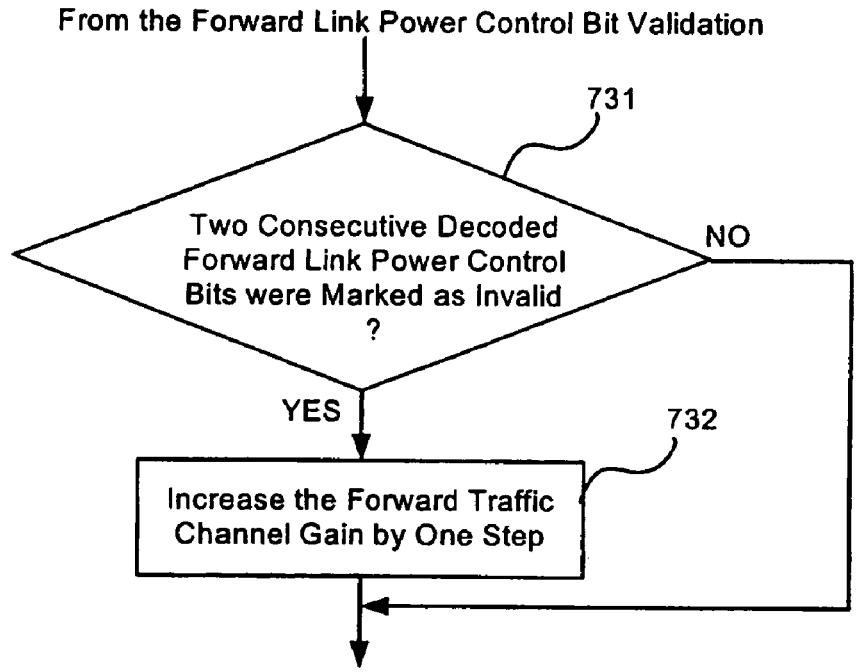
FIG. 9C is a flowchart illustrating a method for increasing a forward link traffic channel gain where two consecutive determinations of invalidity of the power control bit in accordance with any of the methods shown in FIGS. 8A-8C.

Referring to FIGS. 3 and 9C, the base station data processing unit 250 determines whether a specific number of decoded forward link power control bits (e.g., two consecutive decoded forward link power control bits) were marked as invalid (step 731). In a case where two consecutive power control bits are invalid (positive determination in step 731), the gain changer 252 increases the forward link traffic channel gain by one step (step 732). The value of the gain step is predetermined with communication conditions. In a case where one of two consecutive decoded forward link power control bits is valid (negative determination in step 731), the base station data processing unit 250 adjusts the forward link traffic channel gain based on the decoded forward link power control command.

Figure 9D:
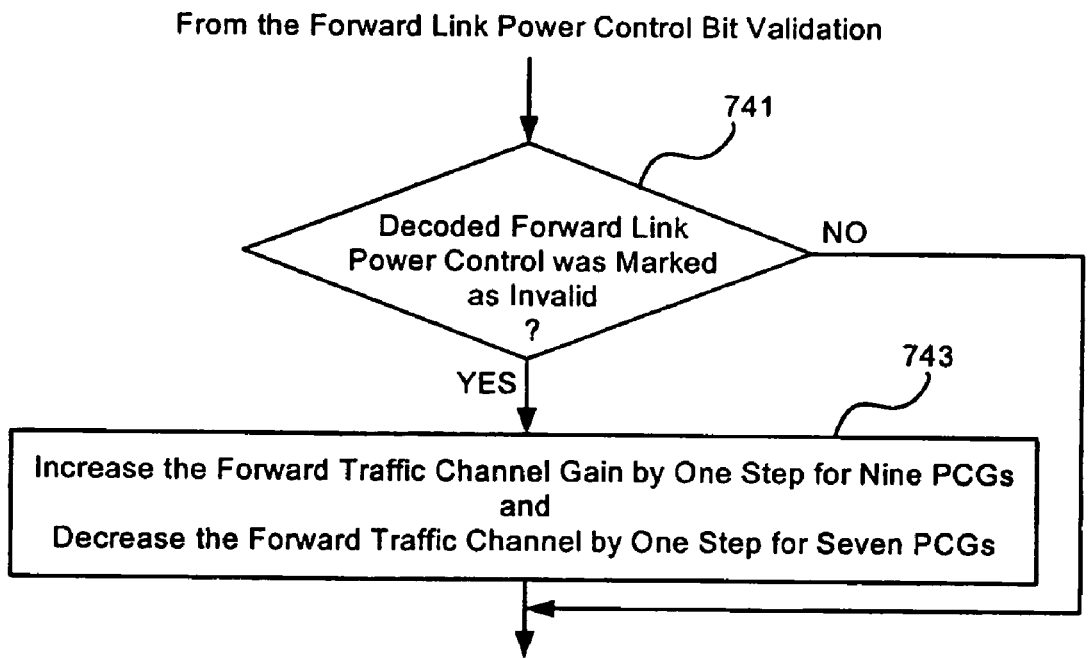
FIG. 9D is a flowchart illustrating a method for increasing and decreasing a forward link traffic channel gain following the determination of invalidity of the power control bit in accordance with any of the methods shown in FIGS. 8A-8C.

Referring to FIGS. 3 and 9D, the base station data processing unit 250 determines whether the decoded forward link power control bit was marked as invalid (step 741). In a case where the power control bit is invalid (positive determination in step 741), the gain changer 252 increases the forward link traffic channel gain using a predetermined pattern in one frame, for example, one step increase for nine power control groups (PCGs) of one frame and one step for another seven PCGs of that frame (step 743). In a case where the decoded forward link power control bit is valid (negative determination in step 741), the base station data processing unit 250 adjusts the forward link traffic channel gain based on the decoded forward link power control command.

In the above mentioned embodiments, the forward link power control bit validation threshold are set (in step 612 of FIG. 8A, in step 622 of FIG. 8B and in step 632 of FIG. 8C) to fixed values TH1, TH2 and TH3, respectively. However, the forward link power control bit validation threshold may be dynamically changed. For example, the validation threshold can be adaptively changed based on certain criteria, for example, communication conditions.

Figure 10:
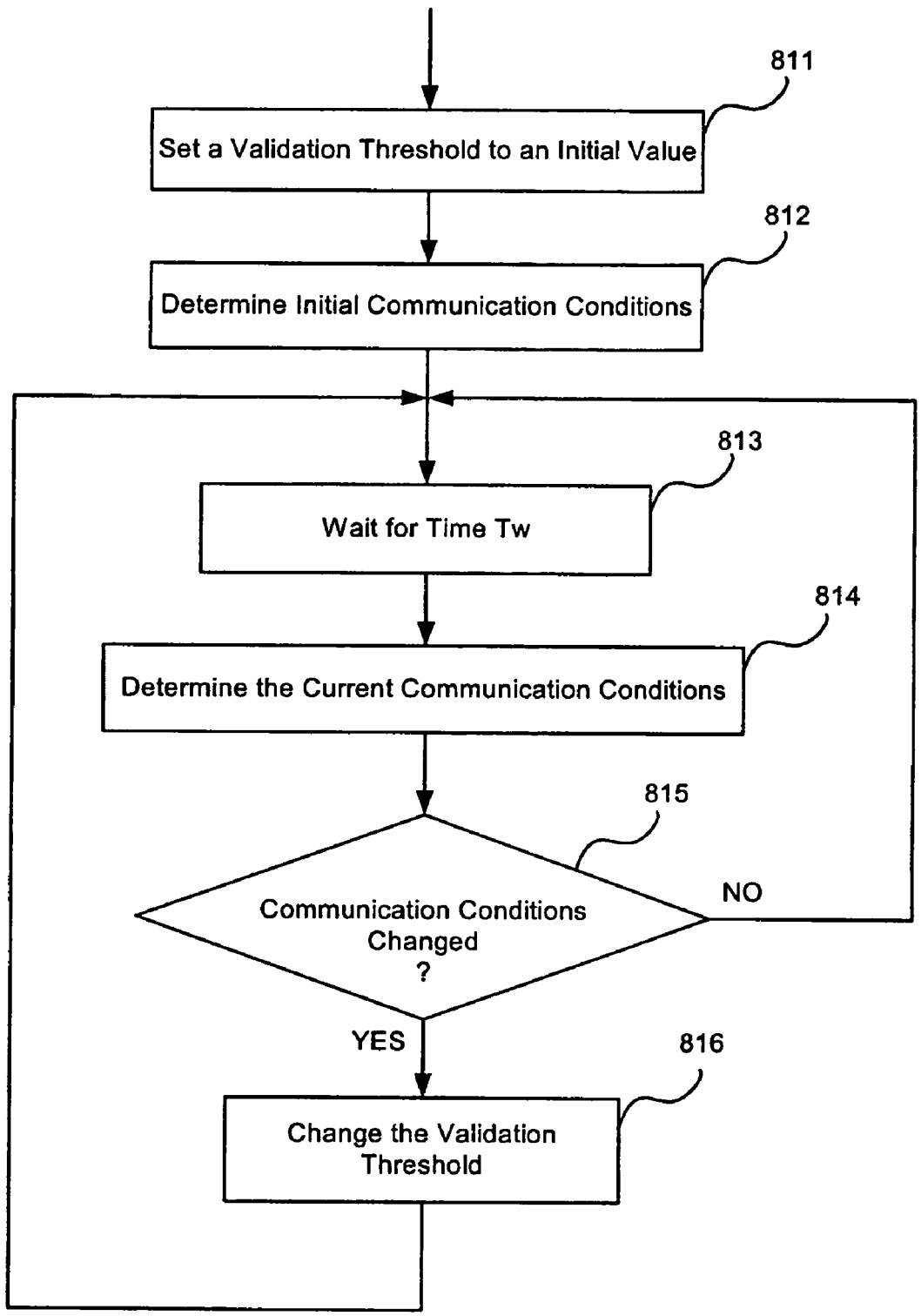
FIG. 10 is a flowchart illustrating a method for adaptively changing the validation threshold set for use in the method shown in FIGS. 8A-8C.

FIG. 10 shows the operation of the base station data processing unit 250 of the base transceiver station 104 to dynamically or adaptively change the value of the validation threshold based on the communication conditions between the base transceiver station 104 and the mobile station 116.

Referring to FIGS. 1, 3, 6A and 10, in response to the control from the base station controller 107, the threshold instruction signal 345 is fed to the threshold provider 339 of the base station data processing unit 250. The control to set the forward link power control bit validation threshold TH is as follows. The forward link power control bit validation threshold TH is set to an initial value TH0 (step 811). The initial communication conditions are determined (step 812). Then, the control waits for given time Tw (step 813) and the current communication conditions are determined (step 814). Based on the current communications determined in step 814 and the previous communication conditions (e.g., determined in step 812), it is determined whether the communication conditions are changed (step 815). In a case of no change to the communication conditions (negative determination in step 815), steps 813-815 are repeated. In a case where the current communication conditions determined in step 814 are changed from the previous communication conditions determined time Tw earlier (positive determination in step 815), the base station data processing unit 250 changes the forward link power control bit validation threshold TH to a new value THn (step 816) and steps 813-815 are repeated. Thus, if the communication conditions change, the forward link power control bit validation threshold will be dynamically or adaptively changed in step 816. The values of such adaptively changed forward link power control bit validation threshold is provided ("mapped") with the threshold instruction signal 345 by the base station controller 107, reflecting communication conditions.

Similarly, the value of the forward link power control bit validation thresholds TH2 and TH3 with respect to the base station data processing unit 250 shown in FIGS. 6B and 6C, respectively, are adaptively set.

The methods for determining validity of the forward link power control bit shown in FIGS. 8A-8C may be performed with reference to the adaptively changed forward link power control bit validation threshold TH in step 816 of FIG. 10. Thus, the forward link power control bit validation threshold TH1, TH2 or TH3 set in step 612, 622 or 632 is dynamically set in accordance with the method shown in FIG. 10. With reference to the adaptively changed forward link power control bit validation threshold, the methods for controlling the forward link traffic channel gain shown in FIGS. 9A-9D can be performed.

The communication conditions referred to the method shown in FIG. 10 are, for example, the mobile speed, the reverse link target frame error rate (FER) set point, which is used for the mobile's reverse link out-loop power control. For example, if the reverse link target FER set point increases, the threshold should also be proportionally increased. If it decreases, the threshold should also be decreased accordingly.

The validation of a decoded forward link power control bit with a closed loop power control may be applicable to a method and an apparatus of the forward link power control in a cellular wireless communication system wherein the operations of the present invention may require modification of some aspects of its supported protocol standard(s).

The methods of forward link power control bit validation as mentioned above are applicable to the reverse link power control bit validation in the mobile station also.

Figure 11:
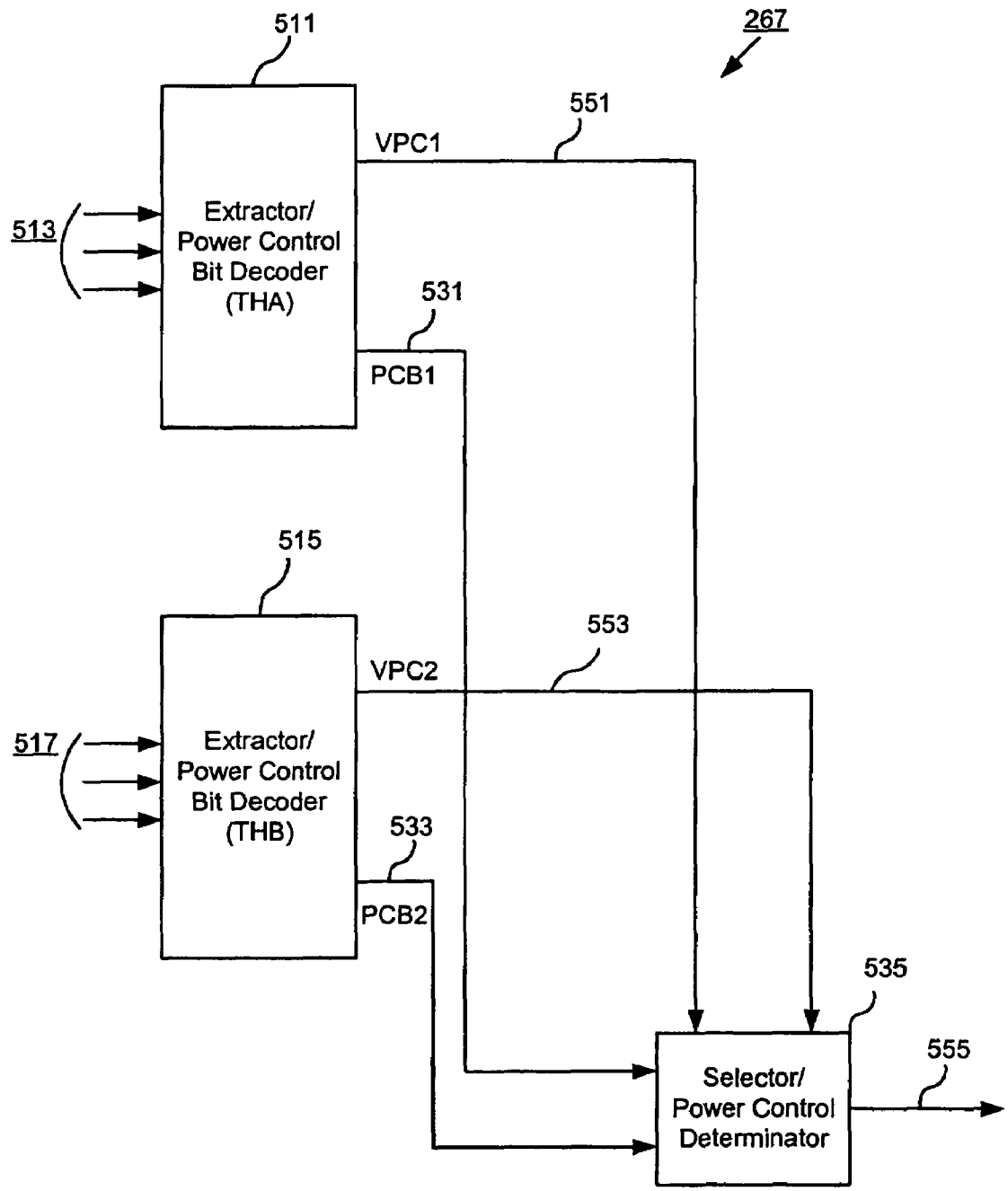
FIG. 11 is a block diagram illustrating a portion of a mobile station shown in FIG. 4, which performs the reverse link power control bit validation.

FIG. 11 is a block diagram illustrating a portion of the mobile data processing unit 267 of the mobile station 116 shown in FIG. 4. Referring to FIGS. 11, 2 and 4, the mobile receiver unit 265 is provided with the forward link channel or signal from the base transceiver stations 104 and 106 and demodulates and decodes the received signals. The mobile receiver unit 265 provides a measured signal-to-noise ratio (S/N), a measured received power and a symbol error rate, among others, with respect to each of the base transceiver stations 104 and 106. The data or information with respect to the first base transceiver station 104 is represented by data processed signals 513 and the data or information with respect to the second base transceiver station 106 is represented by data processed signals 517.

The data processed signals 513 and 517 are fed to extractor/power control bit decoders 511 and 515, respectively. Each of the extractor/power control bit decoders 511 and 515 extracts reverse power control bit signals with respect to the data received from the corresponding base transceiver station. The extractor/power control bit decoder 511 extracts the data fed thereto and provides a first decoded signal 531 representing a first decoded reverse link power control bit PCB1 and a first validation signal 551 representing a first reverse link power control bit validation VPC1 to a selector/power control determinator 535. The decoding function is performed by comparing the forward power control sub-channel energy to a reverse link power control bit validation threshold THA with respect to the first base transceiver station 104. Similarly, the extractor/power control bit decoder 515 extracts the data fed thereto and provides a second decoded signal 533 representing a second decoded reverse link power control bit PCB2 and a second validation signal 553 representing a second reverse link power control bit validation VPC2 to the selector/power control determinator 535. The decoding function is performed by comparing the forward power control sub-channel energy to a reverse link power control bit validation threshold THB with respect to the second base transceiver station 106.

Each of the first and second decoded signals 531 and 533 represents a decoded reverse link power control bit in one power control group (PCG) that has a binary value "1" or "0". The binary value means, for example, that a "1" value requests for increasing the reverse link power and a "0" value requests for decreasing the reverse link power. Each of the first and second validation signals 551 and 553 represents validity or invalidity of the corresponding decoded reverse link power control bit. The selector/power control determinator 535 selects the decoded power control bit in accordance with the provided validity/invalidity data and provides a selection/determination signal 555 representing a valid and selected reverse link power control command.

Figure 12A:
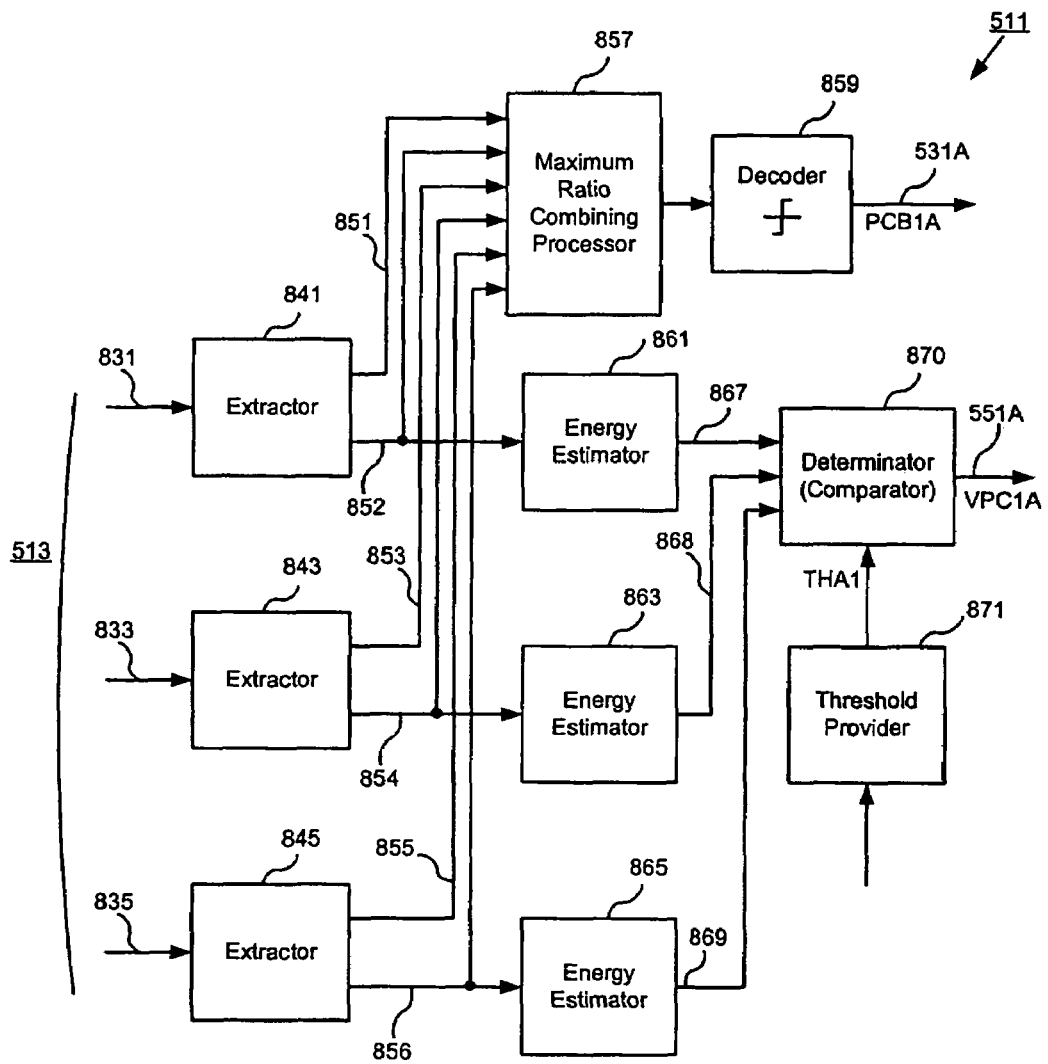
FIG. 12A is a block diagram illustrating a portion of an extractor/power control bit decoder shown in FIG. 11, which performs the decoding of the reverse link power control bit and the operation of the reverse link power control bit validation based on individual finger energies with respect to the first base transceiver station.

FIG. 12A is a block diagram illustrating a portion of an extractor/power control bit decoder 511 shown in FIG. 11, which performs the decoding of the reverse link power control bit and the operation of the reverse link power control bit validation based on individual finger energies with respect to the first base transceiver station 104. Referring to FIG. 12A, in response to the data processed signal 513, a plurality (e.g., three) of finger outputs 831, 833 and 835 are fed to extractors 841, 843 and 845, respectively. The function of each extractor is the same as that of the extractor shown in FIG. 6A. Also, the functions of decoding of the reverse link power control bit and the operation of the reverse link power control bit validation are the same as those shown in FIG. 6A.

The MRC data provided by a maximum ratio combining processor 857 is compared to a predefined decoding threshold by a decoder 859. The decoder 859 provides a first decoded signal 531A representing a first decoded reverse link power control bit PCB1A having a binary value "1" or "0" in one power control group (PCG). The first decoded signal 531A corresponds to the first decoded signal 531 shown in FIG. 11. The first decoded reverse link power control bit PCB1A corresponds to the first decoded reverse link power control bit PCB1. A determinator/comparator 870 provides a first validation signal 551A representing a first reverse link power control bit validation VPC1A. The first validation signal 551A corresponds to the first validation signal 551 shown in FIG. 11. The first reverse link power control bit validation VPC1A corresponds to the first reverse link power control bit validation VPC1.

Reverse power control bit portion signals 851, 853 and 855 and forward power control sub-channel signals 852, 854 and 856 from the extractors 841, 843 and 845 are fed to the maximum ratio combining processor 857 and its combined signal is fed to the decoder 859 which in turn provides the first decoded signal 531A. Also, the forward power control sub-channel signals 852, 854 and 856 are fed to energy estimators 861, 863 and 865 which in turn provide estimated energy signals 867, 868 and 869 to the determinator/comparator 870. Each energy estimator calculates energy per bit ($E_b$) or energy per symbol ($E_s$) based on the forward power control sub-channel signal. The calculated energy estimations by the energy estimators 861, 863 and 865 are fed to the determinator/comparator 870 which compares the estimations to a reverse link power control bit validation threshold THA1 provided by a threshold provider in accordance with a threshold instruction signal. The reverse link power control bit validation threshold THA1 corresponds to the reverse link power control bit validation threshold THA of the extractor/power control bit decoder 511 shown in FIG. 11.

Figure 12B:
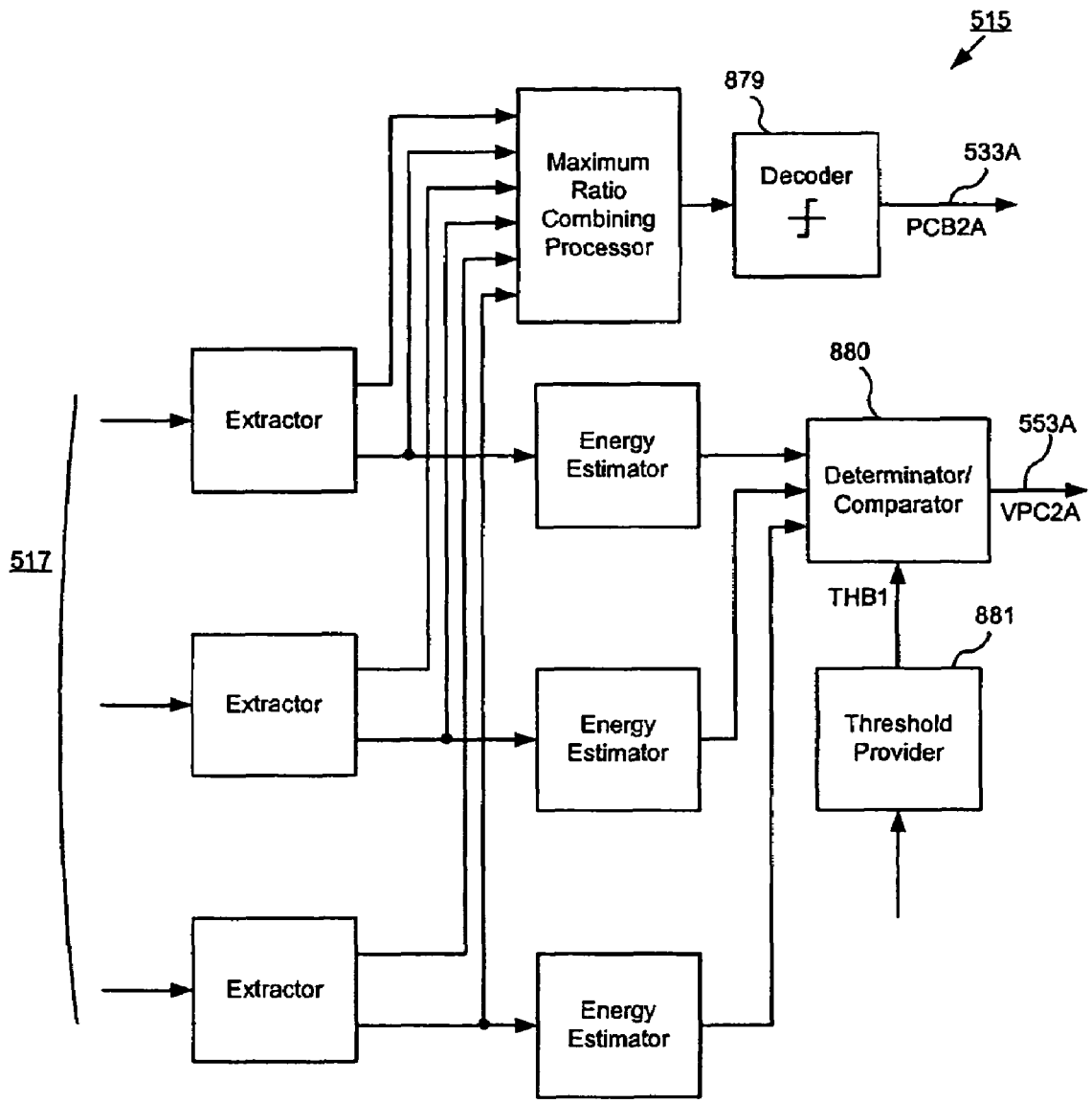
FIG. 12B is a block diagram illustrating a portion of an extractor/power control bit decoder shown in FIG. 11, which performs the decoding of the reverse link power control bit and the operation of the reverse link power control bit validation based on individual finger energies with respect to the second base transceiver station.

FIG. 12B is a block diagram illustrating a portion of an extractor/power control bit decoder 515 shown in FIG. 11, which performs the decoding of the reverse link power control bit and the operation of the reverse link power control bit validation based on the forward power control sub-channel signal of the individual finger with respect to the second base transceiver station 106. Referring to FIG. 12B, in response to the data processed signal 517, a plurality (e.g., three) of finger outputs are fed to corresponding extractors. The function and operation of the extractor/power control bit decoder 515 are the same as those of the extractor/power control bit decoder 511 shown in FIG. 12A.

The MRC data provided by the maximum ratio combining processor is compared to a predefined decoding threshold by a decoder 879 of the extractor/power control bit decoder 515. The decoder 879 provides a second decoded signal 533A representing a second decoded reverse link power control bit PCB2A having a binary value "1" or "0". A determinator/comparator 880 thereof provides a second validation signal 553A representing a second reverse link power control bit validation VPC2A. The second decoded signal 533A and the second validation signal 553A correspond to the second decoded signal 533 and the second validation signal 553 shown in FIG. 11, respectively. The second decoded reverse link power control bit PCB2A and the second reverse link power control bit validation VPC2A correspond to the second decoded reverse link power control bit PCB2 and the second reverse link power control bit validation VPC2, respectively. The calculated energy estimations by the energy estimators are fed to the determinator/comparator 880 which compares the estimations to a reverse link power control bit validation threshold THB1. The reverse link power control bit validation threshold THB1 corresponds to the reverse link power control bit validation threshold THB of the extractor/power control bit decoder 515 shown in FIG. 11.

Figure 13A:
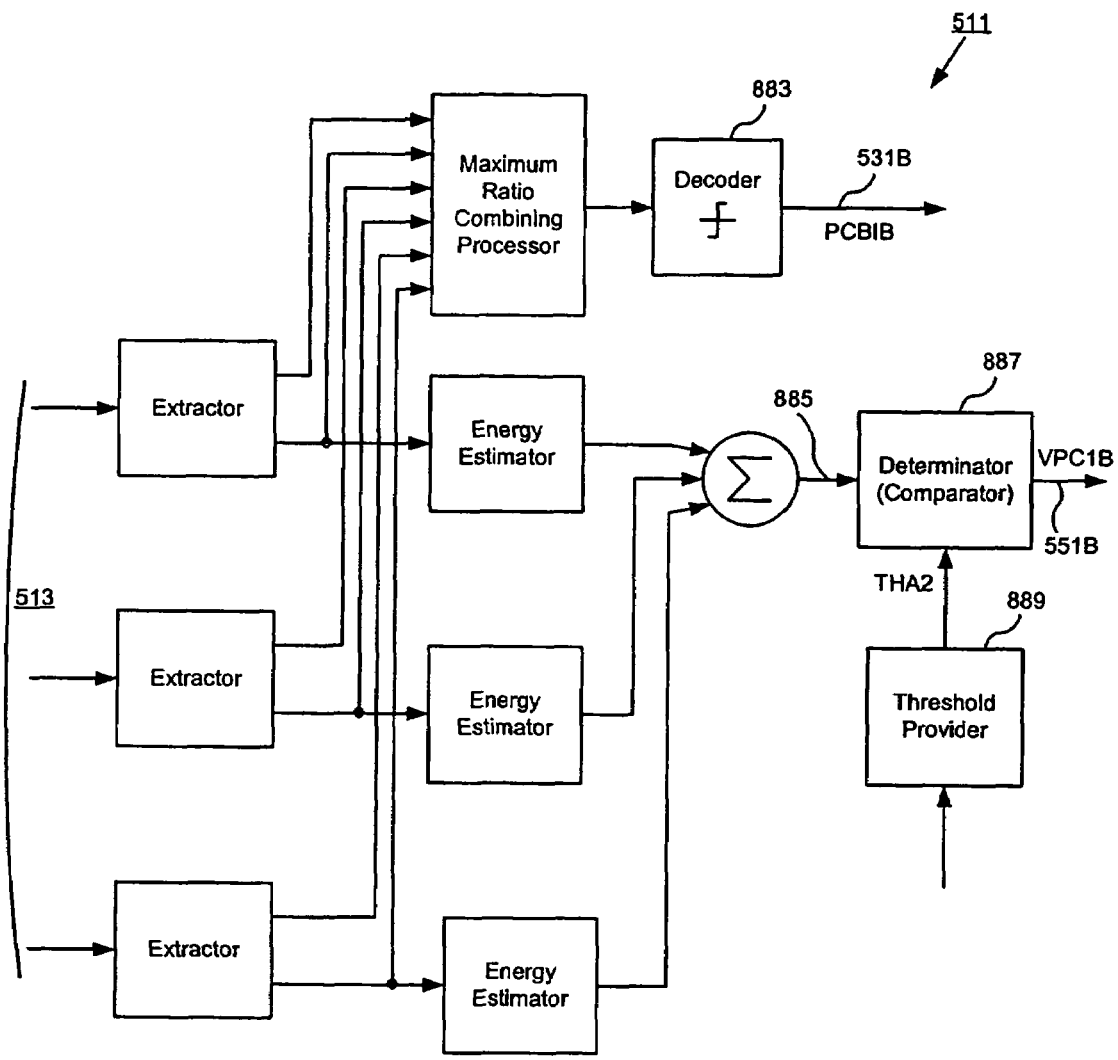
FIG. 13A is a block diagram illustrating a portion of an extractor/power control bit decoder shown in FIG. 11, which performs the decoding of the reverse link power control bit and the operation of the reverse link power control bit validation based on summed finger energies with respect to the first base transceiver station.

FIG. 13A is a block diagram illustrating a portion of an extractor/power control bit decoder 511 shown in FIG. 11, which performs the decoding of the reverse link power control bit and the operation of the reverse link power control bit validation based on summed forward power control sub-channel energies of all the fingers with respect to the first base transceiver station 104. Referring to FIG. 13A, in response to the data processed signal 513, a plurality (e.g., three) of finger outputs are fed to the corresponding extractors. The function of each extractor is the same as that of the extractor shown in FIG. 6B. Also, the functions of decoding of the reverse link power control bit and the operation of the reverse link power control bit validation are the same as those shown in FIG. 6B.

The MRC data provided by the maximum ratio combining processor is compared to a predefined decoding threshold by a decoder 883 and it provides a first decoded signal 531B representing a first decoded reverse link power control bit PCB1B having a binary value "1" or "0". The combined energy estimations represented by a signal 885 is compared to a reverse link power control bit validation threshold of value THA2 provided by a threshold provider 889. A determinator/comparator 887 provides a first validation signal 551B representing a first reverse link power control bit validation VPC1B. The reverse link power control bit validation threshold THA2 corresponds to the reverse link power control bit validation threshold THA of the extractor/power control bit decoder 511 shown in FIG. 11. The first decoded signal 531B and the first validation signal 551B correspond to the first decoded signal 531 and the first validation signal 551 shown in FIG. 11, respectively. The first decoded reverse link power control bit PCB1B and the first reverse link power control bit validation VPC1B correspond to the first decoded reverse link power control bit PCB1 and the first reverse link power control bit validation VPC1, respectively.

Figure 13B:
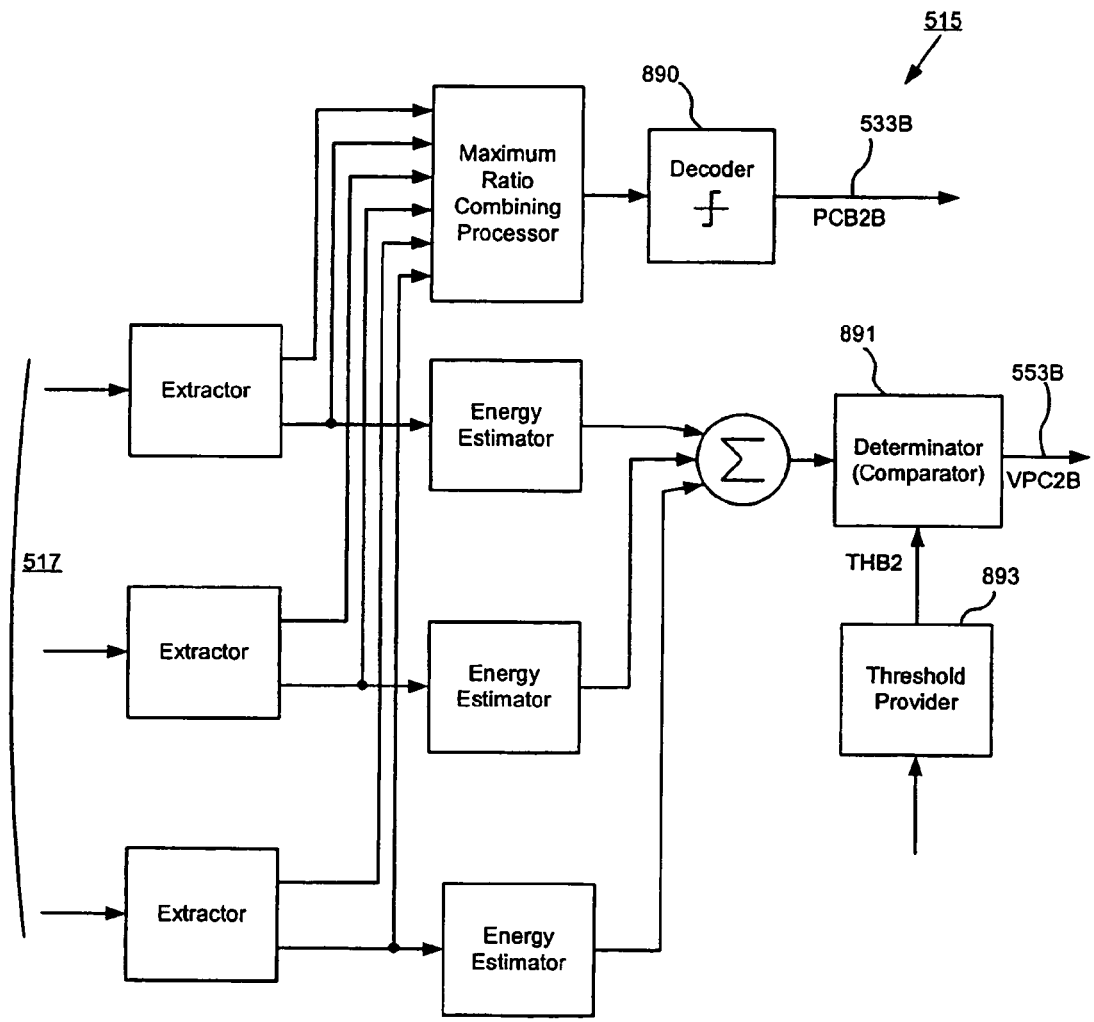
FIG. 13B is a block diagram illustrating a portion of an extractor/power control bit decoder shown in FIG. 11, which performs the decoding of the reverse link power control bit and the operation of the reverse link power control bit validation based on summed finger energies with respect to the second base transceiver station.

FIG. 13B is a block diagram illustrating a portion of an extractor/power control bit decoder 515 shown in FIG. 11, which performs the decoding of the reverse link power control bit and the operation of the reverse link power control bit validation based on summed forward power control sub-channel energies of all the fingers with respect to the second base transceiver station 106. Referring to FIG. 13B, in response to the data processed signal 517, a plurality (e.g., three) of finger outputs are fed to corresponding extractors. The function of each extractor is the same as that of the extractor shown in FIG. 6B. Also, the functions of decoding of the reverse link power control bit and the operation of the reverse link power control bit validation are the same as those shown in FIG. 6B.

The MRC data produced by the maximum ratio combining processor is compared to a predefined decoding threshold by a decoder 890. The decoder 890 provides a second decoded signal 533B representing a second decoded reverse link power control bit PCB2B having a binary value "1" or "0". A determinator/comparator 891 compares the combined energy estimations to a reverse link power control bit validation threshold of value THB2 provided by a threshold provider 893. The determinator/comparator 891 provides a second validation signal 553B representing a second reverse link power control bit validation VPC2B. The reverse link power control bit validation threshold THB2 corresponds to the reverse link power control bit validation threshold THB of the extractor/power control bit decoder 515 shown in FIG. 11. The second decoded signal 533B and the second validation signal 553B correspond to the second decoded signal 533 and the second validation signal 553 shown in FIG. 11, respectively. The second decoded reverse link power control bit PCB2B and the second reverse link power control bit validation VPC2B correspond to the second decoded reverse link power control bit PCB2 and the second reverse link power control bit validation VPC2, respectively.

Figure 14A:
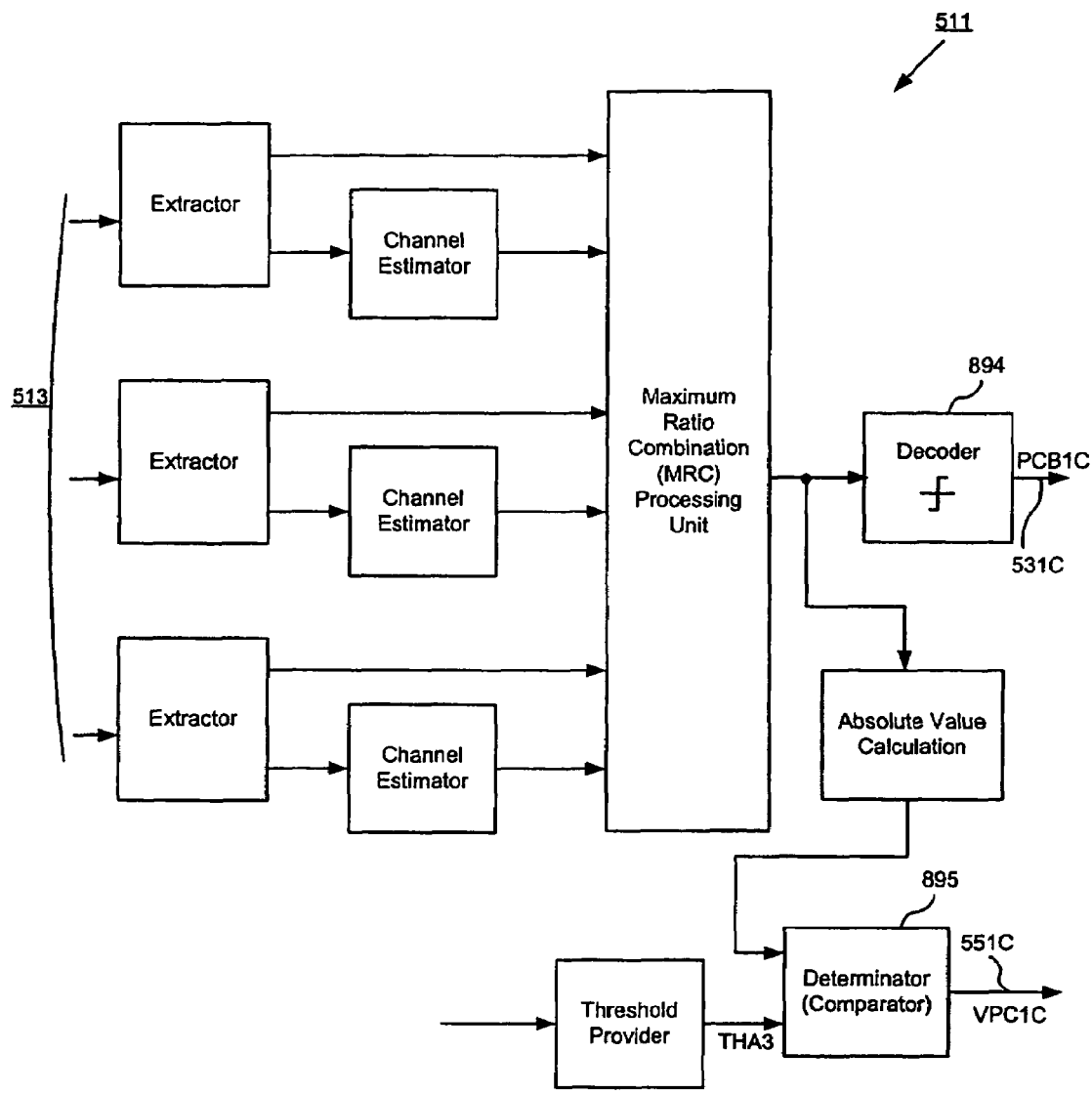
FIG. 14A is a block diagram illustrating a portion of an extractor/power control bit decoder shown in FIG. 11, which performs the decoding of the reverse link power control bit and the operation of the reverse link power control bit validation based on combined power control portions with respect to the first base transceiver station.

FIG. 14A is a block diagram illustrating a portion of an extractor/power control bit decoder 511 shown in FIG. 11, which performs the decoding of the reverse link power control bit and the operation of the forward link power control bit validation based on combined power control portions with respect to the first base transceiver station 104. Referring to FIG. 14A, in response to the data processed signal 513, a plurality (e.g., three) of finger outputs are fed to corresponding channel estimators. The function of each channel estimators is the same as that of the channel estimator shown in FIG. 6C. Also, the functions of decoding of the reverse link power control bit and the operation of the reverse link power control bit validation are the same as those shown in FIG. 6C.

An MRC of the reverse link power control bit portions provided by the maximum ratio combining processor is compared by a decoder 894 and the decoder 894 provides a first decoded signal 531C representing a first decoded reverse link power control bit PCB1C having a binary value "1" or "0". An absolute value of the MRC is compared by a determinator/comparator 895 to a reverse link power control bit validation threshold of value THA3 provided by a threshold provider. The determinator/comparator 895 provides a first validation signal 551C representing a first reverse link power control bit validation VPC1C. The reverse link power control bit validation threshold THA3 corresponds to the reverse link power control bit validation threshold THA of the extractor/power control bit decoder 511 shown in FIG. 11. The first decoded signal 531C and the first validation signal 551C correspond to the first decoded signal 531 and the first validation signal 551 shown in FIG. 11, respectively. The first decoded reverse link power control bit PCB1C and the first reverse link power control bit validation VPC1C correspond to the first decoded reverse link power control bit PCB1 and the first reverse link power control bit validation VPC1, respectively.

Figure 14B:
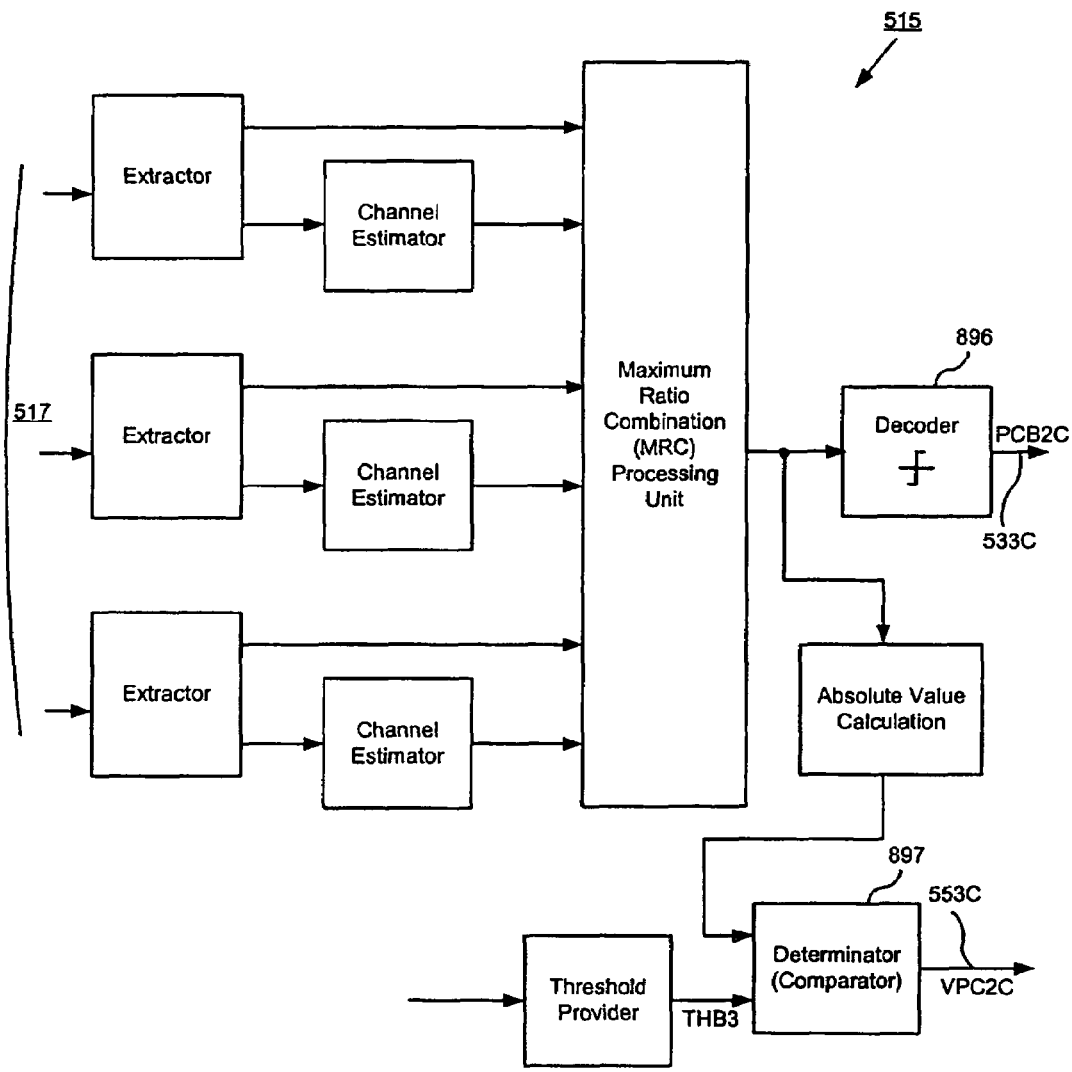
FIG. 14B is a block diagram illustrating a portion of an extractor/power control bit decoder shown in FIG. 11, which performs the decoding of the reverse link power control bit and the operation of the reverse link power control bit validation based on combined power control portions with respect to the second base transceiver station.

FIG. 14B is a block diagram illustrating a portion of an extractor/power control bit decoder 515 shown in FIG. 11, which performs the decoding of the reverse link power control bit and the operation of the forward link power control bit validation based on combined power control portions with respect to the second base transceiver station 106. Referring to FIG. 14B, in response to the data processed signal 517, a plurality (e.g., three) of finger outputs are fed to corresponding channel estimators. The function of each channel estimator is the same as that of the channel estimator shown in FIG. 6C. Also, the functions of decoding of the reverse link power control bit and the operation of the reverse link power control bit validation are the same as those shown in FIG. 6C.

An MRC of the reverse link power control bit portions provided by the maximum ratio combining processor is compared by a decoder 896 and it provides a second decoded signal 533C representing a second decoded reverse link power control bit PCB2C having a binary value "1" or "0". An absolute value of the MRC is compared by a determinator/comparator 897 to a reverse link power control bit validation threshold of value THB3 provided by a threshold provider. The determinator/comparator 897 provides a second validation signal 553C representing a second reverse link power control bit validation VPC2C. The reverse link power control bit validation threshold THB3 corresponds to the reverse link power control bit validation threshold THB of the extractor/power control bit decoder 515 shown in FIG. 11. The second decoded signal 533C and the second validation signal 553C correspond to the second decoded signal 533 and the second validation signal 553 shown in FIG. 11, respectively. The second decoded reverse link power control bit PCB2C and the second reverse link power control bit validation VPC2C correspond to the second decoded reverse link power control bit PCB2 and the second reverse link power control bit validation VPC2, respectively.

Figure 15:
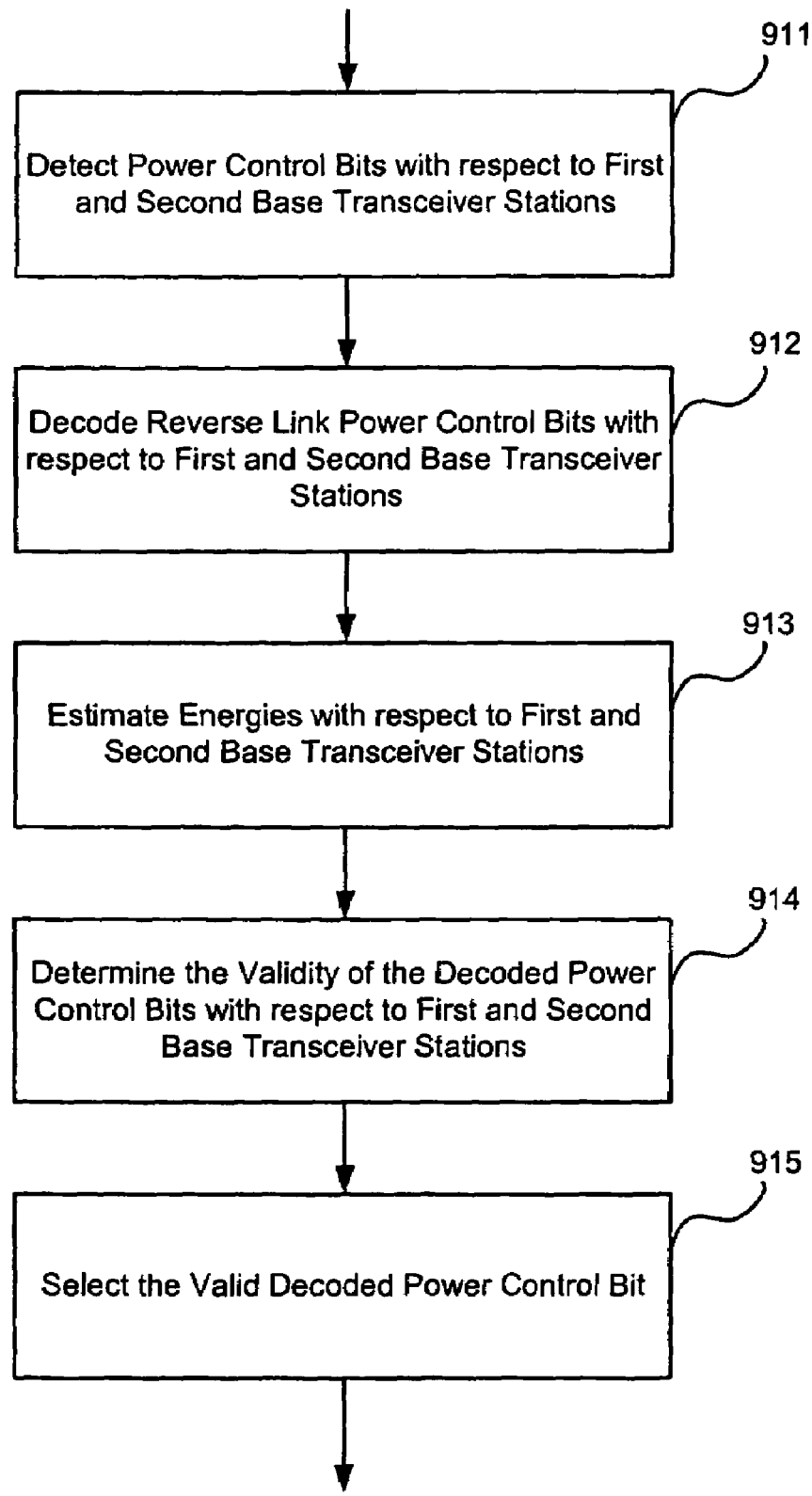
FIG. 15 is a flowchart illustrating a method for selecting of a decoded reverse link power control bit in a mobile station operating in accordance with an embodiment of the present invention.

FIG. 15 shows a method for selecting of a decoded reverse link power control bit in a mobile station. Referring to FIGS. 15, 12A, 12B, 11 and 1-4, the base transceiver stations 104 and 106 track the mobile station 116. The mobile station 116 communicates with the first and second base transceiver stations 104 and 106 and the data processed signals 513 and 517 with respect to them are fed to the mobile station 116. Each extractor of the extractor/power control bit decoder 511 extracts the reverse link power control bit from a power control sub-channel embedded on a forward fundamental channel with respect to the data processed signal 513. Similarly, each extractor of the extractor/power control bit decoder 515 extracts the reverse link power control bit from a power control sub-channel with respect to the data processed signal 517. Thus, the reverse link power control bit portions are detected with respect to the first and second base transceiver stations 104 and 106 (step 911). The decoders 859 and 879 decode the reverse link power control bits in response to the data processed signals 513 and 517 (step 912).

Each of the energy estimators of the extractor/power control bit decoder 511 estimates an energy level of the forward power control sub-channel from the base transceiver station 104, represented by the estimated energy signal is provided. Similarly, each energy estimator of the extractor/power control bit decoder 515 estimates an energy level of the forward power control sub-channel from the base transceiver station 106, represented by the estimated energy signal is provided (step 913).

The reverse link power control bit validation threshold of value THA1 is provided by the threshold provider 871 to the determinator/comparator 870 that compares the energy estimations provided by the energy estimators to the reverse link power control bit validation threshold THA1. In a case where at least one energy estimation is above the reverse link power control bit validation threshold of value THA1, the decoded reverse link power control bit (PCB1A) represented by the first decoded signal 531A is valid. Also, the reverse link power control bit validation threshold of value THB1 is provided by a threshold provider 881 to the determinator/comparator 880 that compares the energy estimations provided by the energy estimators to the reverse link power control bit validation threshold THB1. In a case where the energy estimation is above the reverse link power control bit validation threshold of value THB1, the decoded reverse link power control bit (PCB2A) represented by the second decoded signal 533A is valid (step 914). The operation of comparing the energy estimations to the reverse link power control bit validation threshold is the same as that described in conjunction with FIGS. 5A and 8A It performs the function of determining whether the reverse link power control bit is valid. The values THA1 and THB1 of the reverse link power control bit validation thresholds are the same value or different values from each other.

The validity of the first decoded reverse link power control bit (PCB1) with respect to the base transceiver station 104 is represented by the validity determination signal. The validity of the second decoded reverse link power control bit (PCB2) with respect to the base transceiver station 106 is represented by the validity determination signal. The selector/power control determinator 635 selects the reverse link decoded power control bit represented by the first or second decoded signal 531 or 533 in accordance with the validity (VPC1) represented by the first validation signal 551 and the validity (VPC2) represented by the second validation signal 553 (step 915).

The selector/power control determinator 535 selects the first decoded reverse link power control bit in a case of that control bit being valid, the second decoded reverse link power control bit in a case of that control bit being valid, and the first or second decoded reverse link power control bit a case where both of the first and second decoded reverse link power control bits are valid. The determination for validation and the selection of the reverse link power control bit are made by the selector/power control determinator 535 as follows:

| VPC1 | VPC2 | Selection of Power Control Bit |
|---|---|---|
| Valid | Valid | PCB1 or PCB2 |
| Valid | Invalid | PCB1 |
| Invalid | Valid | PCB2 |
| Invalid | Invalid | None |

In a case where both power control bits are invalid, no increase or decrease of the reverse link transmitted power is required.

The selector/power control determinator 535 provides the selected decoded reverse link power control bit when that decoded reverse link power control bit is for changing the transmission power. The selection/determination signal 555 is provided by the mobile data processing unit 267 to the mobile transmission unit 269. The reverse link power control bit is a binary value, where a "1" value requests for increase in the reverse link power, while a "0" value requests for decrease in the reverse link power. In the mobile transmission unit 269, in response to the reverse link power control bit, the reverse link power is controlled by similar methods described in conjunction with FIGS. 9A-9D. The reverse link transmission power can be changed by the gain changer 275 of the mobile transmission unit 269. In a case wherein both of the first and second decoded reverse link power control bits are valid, the reverse link power control is performed as follows:

| PCB1 | PCB2 | Reverse Link Power Control |
|---|---|---|
| 1 | 1 | Request for Increase |
| 1 | 0 | Request for Decrease |
| 0 | 1 | Request for Decrease |
| 0 | 0 | Request for Decrease |

The values THA1 and THB1 of the reverse link power control bit validation thresholds set by the threshold providers are fixed. However, the reverse link power control bit validation thresholds THA1 and THB1 (as well THA2, THB2; THA3, THB3) may be dynamically changed in accordance with the threshold instruction signals provided thereto and that such dynamically changed value of the reverse link power control bit validation threshold is provided to the determinator/comparator. An example of a dynamic change method is a method for adaptively changing the reverse link power control bit validation threshold, based on certain criteria, for example, communication conditions, as described in conjunction with FIG. 10.

Also, the functions of decoding the reverse link power control bit and determining whether the decoded reverse link power control bit is valid or invalid can be performed by the methods described in conjunction with FIGS. 5B-5C and 8B-8C using the extractor/power control bit decoders 511 and 515 shown in FIGS. 13A and 13B and FIGS. 14A and 14B, respectively. Therefore, the descriptions with reference to FIGS. 5B-5C and 8B-8C are applicable to the methods for decoding the reverse link power control bit and for determining its validity. It is, however, noted that the terms "forward link", "forward link power control bit" and others in the descriptions should be replaced with the terms "reverse link", "reverse link power control bit" and others, if applicable to the control of the reverse link transmission power control.

In each case of the extractor/power control bit decoders 511 and 515 being those shown in FIGS. 12A and 12B, 13A and 13B and 14A, 14B, the reverse link transmission power can be controlled, in accordance with the power control message provided by the mobile data processing unit 267. The control of the reverse link is made by similar methods to those described in conjunction with FIGS. 9A-9D. The reverse link transmission power can be changed by the gain changer 275 of the mobile transmission unit 269.

In the embodiment, the mobile station 116 communicates with two base transceiver stations 104 and 106. The mobile station 116 may, however, communicate with N (e.g., three)

base transceiver stations and the mobile data processing unit 267 may include N extractor/power control bit decoders (corresponding to the extractor/power control bit decoders 511 and 515 shown in FIG. 11). In such a case, each extractor/power control bit decoders extracts a power control bit signal with respect to the data received from the corresponding base transceiver station to provide a reverse link power control bit validation. Also, each extractor/power control bit decoders decodes the reverse link power control bit. Based on the N reverse link power control bit validations and the N decoded reverse link power control bits, the reverse link power control bit is selected and a reverse link command for controlling the reverse link transmission power is provided. If, for example, at least one decoded reverse link power control bit which is valid is of a value "1", the mobile transmission unit 269 of the mobile station 116 will increase the reverse link transmission power.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of forward link power control in a cellular wireless communication system including at least one base transceiver station and at least one mobile station, the base transceiver station including a finger processor formed by a RAKE receiver, the finger processor having fingers for producing a signal in response to a reverse data traffic from the mobile station, the base transceiver station tracking the mobile station with reference to a tracking threshold value determined by communication conditions, the base transceiver station and the mobile station being operably connected by a closed loop power control, the method comprising:

decoding a forward link power control bit from a reverse power control sub-channel embedded on a reverse pilot channel in one power control group;

setting a forward link power control bit validation threshold for determining whether the decoded forward link power control bit is valid, the forward link power control bit validation threshold being independent of the tracking threshold;

detecting a value of a signal level produced by the fingers of the finger processor in one power control group in relation to the forward link power control bit; and comparing the value of the detected signal level to the set forward link power control bit validation threshold, to determine whether the decoded forward link power control bit in relation to one power control group is valid.

2. The method of claim 1, wherein the detecting step includes:

calculating energy equivalent to an estimation of the ratio of signal energy per bit to the interference power spectral density with respect to each finger of the finger processor.

3. The method of claim 2, wherein the step of comparing the value of the detected signal level includes:

comparing the calculated energy with respect to each finger of the finger processor to the set forward link power control bit validation threshold.

4. The method of claim 3, wherein the step of comparing the value of the detected signal level further includes:

determining the validity of the decoded forward link power control bit in relation to the one power control group in a case where a predetermined number of the calculated energies with respect to the fingers of the finger processor exceeds the set forward link power control bit validation threshold.

5. The method of claim 3, wherein the step of comparing the value of the detected signal level further includes:

determining the validity of the decoded forward link power control bit in relation to one power control group in a case where at least one calculated energy in the one power control group with respect to the finger of the finger processor exceeds the set forward link power control bit validation threshold.

6. The method of claim 3, wherein the step of comparing the value of the detected signal level further includes:

determining the validity of the decoded forward link power control bit in relation to one power control group in a case where a majority number of the calculated energies in the one power control group with respect to the fingers of the finger processor exceeds the set forward link power control bit validation threshold.

7. The method of claim 1, wherein the decoding step includes:

obtaining power control portions embedded in a reverse power channel based on the signal produced by the fingers of the finger processor;

combining the obtained power control portions with respect to the one power control group in accordance with Maximum Ratio Combination; and obtaining the forward link power control bit, by comparing the combined power control portions to a decoding threshold, the forward link power control bit having a binary value.

8. The method of claim 2, wherein the calculating step includes:

summing the calculated energies with respect to the fingers of the finger processor in the one power control group.

9. The method of claim 8, wherein the step of comparing the value of the detected signal level includes:

comparing the summed energies in the one power control group to the set forward link power control bit validation threshold.

10. The method of claim 8, wherein the step of comparing the value of the detected signal level further includes:

finding the validity of the decoded forward link power control bit in relation to the one power control group, by comparing the summed energies in the one power control group to the set forward link power control bit validation threshold.

11. The method of claim 10, wherein the finding step includes:

determining the validity of the decoded forward link power control bit in relation to the one power control group in a case of the summed energies in the one power control group exceeding the set forward link power control bit validation threshold.

12. The method of claim 1, wherein the detecting step includes:

obtaining power control portions embedded in a reverse power channel based on the signal produced by the fingers of the finger processor.

13. The method of claim 12, wherein the detecting step further includes:

combining the obtained power control portions with respect to the one power control group to produce an absolute value amplitude of the summed value of power control portions, the combining being performed in accordance with Maximum Ratio Combination.

14. The method of claim 12, wherein the step of comparing the value of the detected signal level includes:
   comparing the absolute value amplitude to the set forward link power control bit validation threshold.

15. The method of claim 14, wherein the step of comparing the value of the detected signal level further includes:
   finding the validity of the decoded forward link power control bit in relation to the one power control group, by comparing the absolute value amplitude in the one power control group to the set forward link power control bit validation threshold.

16. The method of claim 15, wherein the finding step includes:
   determining the validity of the decoded forward link power control bit in relation to the one power control group in a case where the absolute value amplitude in the one power control group exceeds the set forward link power control bit validation threshold.

17. The method of claim 1, wherein the setting step includes:
   providing a predetermined fixed value as the forward link power control bit validation threshold, the predetermined fixed value being different from the value of the tracking threshold.

18. The method of claim 17, wherein the providing step includes:
   providing the fixed value of the forward link power control bit validation threshold that is greater than the value of the tracking threshold.

19. The method of claim 1, wherein the setting step includes:
   providing a variable value as the value of the forward link power control bit validation threshold that is adaptively changed based on communication conditions, the variable value being different from the value of the tracking threshold.

20. The method of claim 19, wherein the providing step includes:
   producing the variable value of the forward link power control bit validation threshold that is greater than the value of the tracking threshold, in response to a change instruction from a base station controller.

21. The method of claim 20, wherein the producing step includes:
   changing the value of the forward link power control bit validation threshold based on the mobile speed.

22. The method of claim 20, wherein the producing step includes:
   changing the value of the forward link power control bit validation threshold based on the reverse link target frame error rate set point that is used for the mobile station's reverse link out loop power control.

23. The method of claim 20, wherein the producing step includes:
   changing the value of the forward link power control bit validation threshold proportionally to an increase or a decrease in the reverse link target frame error rate set point.

24. The method of claim 1, further including:
   marking the decoded forward link power control bit in relation to one power control group as valid or invalid in response to the result of the determination of the step of comparing the value of the detected signal level.

25. The method of claim 24, further including:
   changing a forward link traffic channel gain in response to the marking by the marking step, to control the forward link transmission power.

26. The method of claim 25, wherein the changing step includes:
   increasing the forward link traffic channel gain in a case of the decoded forward link power control bit being marked as invalid, to increase the control power of the forward link.

27. The method of claim 26, wherein the increasing step includes:
   increasing the forward link traffic channel gain by a step of a predetermined value, in a case of each marking of the invalidity of the decoded forward link power control bit.

28. The method of claim 26, wherein the increasing step includes:
   increasing the forward link traffic channel gain by a step of a predetermined value, in a case of a predetermined number of consecutive markings of the invalidity of the decoded forward link power control bit.

29. The method of claim 28, wherein the predetermined number of the consecutive markings is two.

30. The method of claim 25, wherein the changing step includes:
   continuously increasing the forward link traffic channel gain either with a constant step or using a predetermined pattern each frame.

31. The method of claim 25, wherein in a case of the decoded forward link power control bit being marked as invalid, the changing step includes:
   continuously increasing the forward link traffic channel gain by a step of a first value for a predetermined number of the power control groups of one forward traffic frame, thereby increasing the control power of the forward link; and
   continuously decreasing the forward link traffic channel gain by a step of a second value for the rest of the power control groups of that forward traffic frame, thereby decreasing the control power of the forward link.

32. The method of claim 31, wherein:
   the one forward traffic frame contains sixteen power control groups; and
   the predetermined number is nine, so that the forward link traffic channel gain is increased by the step of the first value for nine power control groups and decreased by the step of the second value for seven power control groups.

33. The method of claim 31, wherein:
   the second value is the same value as the first value.

34. The method of claim 1 which is performed by the base transceiver station included in the cellular wireless communication system.

35. A cellular wireless communication system wherein a forward link power control is performed by a closed loop power control, the cellular wireless communication system comprising a base transceiver station for tracking a mobile station with reference to a tracking threshold value, the base transceiver station including:
   a decoder for decoding a forward link power control bit from a reverse power control sub-channel embedded on a reverse pilot channel in one power control group;
   a threshold setter for setting a forward link power control bit validation threshold for determining whether the decoded forward link power control bit is valid, the forward link power control bit validation threshold being independent of the tracking threshold;
   a detector for detecting a signal level of the signal produced by the fingers of the finger processor in one power control group in relation to the forward link power control bit; and a comparator for comparing the value of the detected signal level to the set forward link power control bit validation threshold, so as to determine whether the decoded forward link power control bit in relation to one power control group is valid.

36. The cellular wireless communication system of claim 35, wherein the base transceiver station further includes:
a calculator for calculating energy equivalent to an estimation of the ratio of signal energy per bit to the interference power spectral density with respect to each finger of the finger processor.

37. The cellular wireless communication system of claim 35, wherein the base transceiver station further includes:
a determinator for determining the validity of the decoded forward link power control bit in relation to one power control group in a case where at least one calculated energy in the one power control group with respect to the finger of the finger processor exceeds the set forward link power control bit validation threshold.

38. The cellular wireless communication system of claim 35, wherein the decoder includes:
an extractor for obtaining power control portions embedded in a reverse power channel based on the signal produced by the fingers of the finger processor;
a combiner for combining the obtained power control portions with respect to the one power control group in accordance with Maximum Ratio Combination; and
a control bit decoder for obtaining the forward link power control bit from the combined power control portions, by comparing the combined power control portions to a decoding threshold, the forward link power control bit having a binary value.

39. The cellular wireless communication system of claim 36, wherein the base transceiver station further includes:
a combiner for summing the calculated energies with respect to the fingers of the finger processor in the one power control group; and
a determinator for determining the validity of the decoded forward link power control bit in relation to the one power control group in a case of the summed energies in the one power control group exceeding the set forward link power control bit validation threshold.

40. The cellular wireless communication system of claim 35, wherein the base transceiver station further includes:
a power control portion extractor for obtaining power control portions embedded in a reverse power channel based on the signal produced by the fingers of the finger processor;
a combiner for combining the obtained power control portions with respect to the one power control group to produce an absolute value amplitude of the combined value of power control portions; and
a determinator for determining the validity of the decoded forward link power control bit in relation to the one power control group in a case where the absolute value amplitude in the one power control group exceeds the set forward link power control bit validation threshold.

41. The cellular wireless communication system of claim 40, wherein the combiner includes:
a combiner for combining the obtained power control portions with respect to the one power control group in accordance with Maximum Ratio Combination.

42. The cellular wireless communication system of claim 35, wherein the threshold setter includes:
a setter for setting the forward link power control bit validation threshold to a predetermined fixed value that is greater than the value of the tracking threshold.

43. The cellular wireless communication system of claim 35, wherein the threshold setter includes:
a setter for setting adaptively the forward link power control bit validation threshold based on communication conditions, the adaptively set forward link power control bit validation threshold being different from the value of the tracking threshold.

44. The cellular wireless communication system of claim 35, wherein the threshold setter includes:
a threshold value changer for changing the value of the forward link power control bit validation threshold based on the reverse link target frame error rate set point that is used for the mobile station's reverse link out loop power control.

45. The cellular wireless communication system of claim 35, wherein the base transceiver further includes:
a marker for marking the decoded forward link power control bit in relation to one power control group as valid or invalid in response to the result of the determining; and
a forward link gain changer for changing a forward link traffic channel gain in response to the marking, to change the control power of the forward link.

46. The cellular wireless communication system of claim 45, wherein the forward link gain changer includes:
a gain changer for continuously increasing the forward link traffic channel gain either with a constant step or using a predetermined pattern each frame.

47. The cellular wireless communication system of claim 45, wherein the forward link gain changer includes:
a gain changer for increasing the forward link traffic channel gain by a step of a predetermined value, in a case of each marking of the invalidity of the decoded forward link power control bit.

48. The cellular wireless communication system of claim 45, wherein the forward link gain changer includes:
a gain changer for (i) continuously increasing the forward link traffic channel gain by a step of a predetermined value for a predetermined number of the power control groups of one forward traffic frame, thereby increasing the control power of the forward link; and (ii) continuously decreasing the forward link traffic channel gain by a step of the predetermined value for the rest of the power control groups of that forward traffic frame, thereby decreasing the control power of the forward link.

49. A method for controlling transmission power in a cellular wireless communication system including a plurality of base transceiver stations tracking a mobile station, the method, performed by the mobile station comprising:
decoding a reverse link power control bit from a forward pilot channel with respect to each of the plurality of base transceiver stations;
estimating an energy level of communication between the mobile station and each of the plurality of base transceiver stations;
determining whether each decoded reverse link power control bit is valid in response to the corresponding energy estimation; and
selecting the decoded reverse link power control bit in response to the determination of validity of the reverse link power control bit, the decoded reverse link power control bit determined as valid and selected being provided for the reverse link power control;
wherein the plurality of base transceiver stations includes first and second base transceiver stations:

the decoding step includes
    decoding a reverse link power control bit from a forward power control sub-channel embedded in the forward fundamental channel with respect to the first base transceiver station, thereby obtaining a first decoded reverse link power control bit; and
    decoding a reverse link power control bit from a forward power control sub-channel embedded in the forward fundamental channel with respect to the second base transceiver station, thereby obtaining a second decoded reverse link power control bit,
the estimating step includes
    estimating an energy level of communication between the mobile station and the first base transceiver station, thereby obtaining a first energy estimation; and
    estimating an energy level of communication between the mobile station and the second base transceiver station, thereby obtaining a second energy estimation,
the determining step includes
    determining whether the first decoded reverse fink power control bit is valid, in response to the first energy estimation; and
    determining whether the second decoded reverse link power control bit is valid, in response to the second energy estimation, and
the selecting step includes
    selecting the first decoded reverse link power control bit or the second decoded reverse link power control bit in response to the determinations of validity of the first and second reverse link power control bits.

50. The method of claim 49, wherein:
the estimating step for obtaining the first energy estimation includes
    calculating energies in one power control group in relation to the reverse link power control bit with respect to the first base transceiver station, and the estimating step for obtaining the second energy estimation includes
    calculating energies in one power control group in relation to the reverse link power control bit with respect to the second base transceiver station.

51. The method of claim 50, wherein:
the determining step of the first decoded reverse link power control bit includes
    setting a first reverse link power control bit validation threshold; and
the determining step of the second decoded reverse link power control bit includes
    setting a second reverse link power control bit validation threshold.

52. The method of claim 51, further including:
comparing the first energy estimation to the first reverse link power control bit validation threshold to determine whether the first decoded reverse link power control bit is valid; and
comparing the second energy estimation to the second reverse link power control bit validation threshold to determine whether the second decoded reverse link power control bit is valid.

53. The method of claim 52, wherein the setting step of a second reverse link power control bit validation threshold includes:
    setting the second reverse link power control bit validation threshold to a value that is the same as or different from that of the first reverse link power control bit validation threshold.

54. The method of claim 52, wherein:
the setting step of the first reverse link power control bit validation threshold includes
    setting the first reverse link power control bit validation threshold to a fixed value or adaptively changed value, and
the setting step of the second reverse link power control bit validation threshold includes
    setting the second reverse link power control bit validation threshold to a fixed value or adaptively changed value.

55. The method of claim 49, wherein the selecting step includes:
    selecting the first decoded reverse link power control bit in a case of that control bit being valid;
    selecting the second reverse link power control bit in a case of that control bit being valid; and
    selecting the first or second decoded reverse link power control bit a case where both of the first and second decoded reverse link power control bits are valid.

56. The method of claim 55, wherein the selecting step further includes:
    providing the selected decoded reverse link power control bit when that decoded reverse link power control bit is for changing the reverse link transmission power.

57. The method of claim 56, wherein the providing step further includes:
    changing the reverse link transmission power in accordance with the selected decoded reverse link power control bit.

58. The method of claim 55, wherein the selecting step further includes:
    providing the selected decoded reverse link power control bit when that decoded reverse link power control bit is for increasing the reverse link transmission power; and
    increasing the reverse link transmission power in accordance with the selected decoded reverse link power control bit.

59. The method of claim 49, wherein each of the decoding steps for obtaining the first and second decoded reverse link power control bits includes:
    obtaining power control portions embedded in a forward power channel with respect to the corresponding base transceiver station;
    combining the obtained power control portions with respect to the one power control group in accordance with Maximum Ratio Combination; and
    obtaining the respective reverse link power control bit, by comparing the combined power control portions to a decoding threshold, the respective reverse link power control bit having a binary value.

60. An apparatus for controlling transmission power in a cellular wireless communication system including a plurality of base transceiver stations which track a mobile station, the apparatus comprising:
    a decoder for decoding a reverse link power control bit from a power control sub-channel embedded on a forward pilot channel with respect to each of the plurality of base transceiver stations;
    an estimator for estimating an energy level of communication between the mobile station and each of the plurality of base transceiver stations;
    a determinator for determining whether the decoded reverse link power control bit is valid in response to the energy estimation; and
    a selector for selecting the decoded reverse link power control bit in response to the determination of validity of the reverse link power control bit, the decoded reverse link power control bit determined as valid and selected being provided for the reverse link power control;

wherein the plurality of base transceiver stations include first and second base transceiver stations, the decoder including:
- a first decoder for decoding a reverse link power control bit from a power control sub-channel embedded on a forward pilot channel with respect to the first base transceiver station, thereby obtaining a first decoded reverse link power control bit; and
- a second decoder for decoding a reverse link power control bit from a power control sub-channel embedded on a forward pilot channel with respect to the second base transceiver station, thereby obtaining a second decoded reverse link power control bit, the estimator including:
- a first estimator for estimating an energy level of communication between the mobile station and the first base transceiver station, thereby obtaining a first energy estimation; and
- a second estimator for estimating an energy level of communication between the mobile station and the second base transceiver station, thereby obtaining a second energy estimation, the determinator including:
- a first determinator for determining whether the first decoded reverse link power control bit is valid, in response to the first energy estimation; and
- a second determinator for determining whether the second decoded reverse link power control bit is valid, in response to the second energy estimation, the selector including:
- a selector for selecting the first decoded reverse link power control bit or the second decoded reverse link power control bit in response to the determinations of validity of the first and second reverse link power control bits.

61. The apparatus of claim 60, wherein:
the first estimator includes
- a calculator for calculating energies in one power control group in relation to the reverse link power control bit with respect to the first base transceiver station, and the second estimator includes
- a calculator for calculating energies in one power control group in relation to the reverse link power control bit with respect to the second base transceiver station.

62. The apparatus of claim 61, wherein:
the first determinator includes
- a first threshold setter for setting a first reverse link power control bit validation threshold, and the second determinator includes
- a second threshold setter for setting a second reverse link power control bit validation threshold.

63. The apparatus of claim 62, further including:
- a first comparator for comparing the first energy estimation to the first reverse link power control bit validation threshold to determine whether the first decoded reverse link power control bit is valid; and
- a second comparator for comparing the second energy estimation to the second reverse link power control bit validation threshold to determine whether the second decoded reverse link power control bit is valid.

64. The apparatus of claim 63, wherein the second threshold setter includes:
- a setter for setting the second reverse link power control bit validation threshold to a value that is the same as or different from that of the first reverse link power control bit validation threshold.

65. The apparatus of claim 63, wherein:
the first threshold setter includes
- a setter for setting the first reverse link power control bit validation threshold to a fixed value or adaptively changed value, and the second threshold setter includes
- a setter for setting the second reverse link power control bit validation threshold to a fixed value or adaptively changed value.

66. The apparatus of claim 60, wherein the selector includes:
- a selection unit for (i) selecting the first decoded reverse link power control bit in a case of that control bit being valid; (ii) selecting the second reverse link power control bit in a case of that control bit being valid; and (iii) selecting the first or second decoded reverse link power control bit a case where both of the first and second decoded reverse link power control bits are valid.

67. The apparatus of claim 66, further including:
- a provider for providing the selected decoded reverse link power control bit when that decoded reverse link power control bit is for changing the reverse link transmission power.

68. The apparatus of claim 67, further including:
- a changer for changing the reverse link transmission power in accordance with the selected decoded reverse link power control bit.

69. The apparatus of claim 66, further including:
- a provider for providing the selected decoded reverse link power control bit when that decoded reverse link power control bit is for increasing the reverse link transmission power; and
- a changer for changing the reverse link transmission power in accordance with the selected decoded reverse link power control bit.

70. The apparatus of claim 60, wherein each of the first and second decoders includes:
- a provider for obtaining power control portions embedded in a forward power channel with respect to the corresponding base transceiver station,
- a combiner for combining the obtained power control portions with respect to the one power control group in accordance with Maximum Ratio Combination; and
- a control bit decoder for obtaining the respective reverse link power control bit, by comparing the combined power control portions to a decoding threshold, the respective reverse link power control bit having a binary value.

71. A method for controlling transmission power in a cellular wireless communication system including at least first and second base transceiver stations and at least one mobile station, each base transceiver station including a finger processor formed by a RAKE receiver, the finger processor having fingers for producing a signal in response to a reverse data traffic from the mobile station, each base transceiver stations tracking the mobile station with reference to a tracking threshold value determined by communication conditions, each base transceiver station and the mobile station being operably connected by a closed loop power control, the method comprising, performed by each of the base transceiver stations:

decoding a forward link power control bit from a reverse power control sub-channel embedded on a reverse pilot channel;

setting a forward link power control bit validation threshold for determining whether the decoded forward link power control bit is valid, the forward link power control bit validation threshold being independent of the tracking threshold;

detecting a signal level of the signal produced by the fingers of the finger processor in one power control group in relation to the forward link power control bit; and comparing the value of the detected signal level to the set forward link power control bit validation threshold, so as to determine whether the decoded forward link power control bit in relation to one power control group is valid, the decoded forward link power control bit determined as valid being provided for the forward link power control, the method further comprising, performed by the mobile station:

decoding a reverse link power control bit from a forward pilot channel with respect to the first base transceiver station, thereby obtaining a first decoded reverse link power control bit;

decoding a reverse link power control bit from a forward pilot channel with respect to the second base transceiver station, thereby obtaining a second decoded reverse link power control bit;

estimating an energy level of communication between the mobile station and the first base transceiver station, thereby obtaining a first energy estimation;

estimating an energy level of communication between the mobile station and the second base transceiver station, thereby obtaining a second energy estimation;

determining whether the first decoded reverse link power control bit is valid, in response to the first energy estimation;

determining whether the second decoded reverse link power control bit is valid, in response to the second energy estimation; and selecting the first decoded reverse link power control bit or the second decoded reverse link power control bit in response to the determinations of validity of the first and second reverse link power control bits, the decoded reverse link power control bit determined as valid and selected being provided for the reverse link power control.

72. The method of claim 71, wherein:

the detecting step performed by the base transceiver station includes calculating an energy equivalent to an estimation of the ratio of signal energy per bit to the interference power spectral density with respect to each finger of the finger processor, the step of comparing the value of the detected signal level includes comparing the calculated energy with respect to each finger of the finger processor to the set forward link power control bit validation threshold; and determining the validity of the decoded forward link power control bit in relation to the one power control group in a case where the calculated energy exceeds the set forward link power control bit validation threshold, the estimating step for obtaining the first energy estimation includes calculating energies in one power control group in relation to the reverse link power control bit with respect to the first base transceiver station, and the estimating step for obtaining the second energy estimation includes calculating energies in one power control group in relation to the reverse link power control bit with respect to the second base transceiver station.

73. The method of claim 72, wherein:

the determining step of the first decoded reverse link power control bit performed by the mobile station includes setting a first reverse link power control bit validation threshold; and comparing the first energy estimation to the first reverse link power control bit validation threshold to determine whether the first decoded reverse link power control bit is valid, and the determining step of the second decoded reverse link power control bit performed by the mobile station includes setting a second reverse link power control bit validation threshold; and comparing the second energy estimation to the second reverse link power control bit validation threshold to determine whether the second decoded reverse link power control bit is valid.

* * * * *